(12) United States Patent
Baker et al.

(10) Patent No.: US 11,676,512 B2
(45) Date of Patent: Jun. 13, 2023

(54) INJECTION TRAINING DEVICE

(71) Applicant: NOBLE INTERNATIONAL, INC., Orlando, FL (US)

(72) Inventors: Jeff Baker, Orlando, FL (US); Francis Michael Siemer, Orlando, FL (US); Christopher Wai Yin Chung, Orlando, FL (US); Steven H. Madole, Apopka, FL (US); Joseph Reynolds, Belle Isle, FL (US); Seth Freytag, Winter Park, FL (US)

(73) Assignee: NOBLE INTERNATIONAL, INC., Orlando, FL (US)

( * ) Notice: Subject to any disclaimer, the term of this patent is extended or adjusted under 35 U.S.C. 154(b) by 295 days.

(21) Appl. No.: 16/756,946

(22) PCT Filed: Oct. 17, 2018

(86) PCT No.: PCT/US2018/056319
§ 371 (c)(1),
(2) Date: Apr. 17, 2020

(87) PCT Pub. No.: WO2019/079474
PCT Pub. Date: Apr. 25, 2019

(65) Prior Publication Data
US 2021/0134184 A1    May 6, 2021

Related U.S. Application Data

(60) Provisional application No. 62/574,964, filed on Oct. 20, 2017, provisional application No. 62/573,627, filed on Oct. 17, 2017.

(51) Int. Cl.
*G09B 23/28* (2006.01)
*G09B 19/00* (2006.01)

(52) U.S. Cl.
CPC ......... *G09B 23/285* (2013.01); *G09B 19/003* (2013.01)

(58) Field of Classification Search
CPC .................. G09B 23/285; G09B 19/003
See application file for complete search history.

(56) References Cited

U.S. PATENT DOCUMENTS 9,373,269 B2   6/2016  Bergman et al.
10,065,074 B1 * 9/2018  Hoang .................... A41B 1/08
(Continued)

FOREIGN PATENT DOCUMENTS

CA      2976873 A1    8/2006
WO   2013032841 A1   3/2013

OTHER PUBLICATIONS

PCT/US2018/056319; Search Report Written Opinion; dated Jan. 30, 2019;12 pages.

*Primary Examiner* — Xuan M Thai
*Assistant Examiner* — Sadaruz Zaman
(74) *Attorney, Agent, or Firm* — Timothy H. Van Dyke; Wolter, Van Dyke, Davis, PLLC

(57) ABSTRACT

An injection training device for association with a skin of a user and simulating an injection event is provided herein. In a non-limiting embodiment, the injection training device comprises a housing having an opening for receiving a container, the housing comprising at least one sensor for detecting a condition of use of the device, wherein the housing is configured to be positioned at the skin of a user during an injection event.

23 Claims, 22 Drawing Sheets

(56) References Cited

U.S. PATENT DOCUMENTS

| | | | |
|---|---|---|---|
| 10,529,252 B2* | 1/2020 | Baker | A61M 5/3287 |
| 10,729,852 B2* | 8/2020 | Baker | A61M 5/326 |
| 10,748,449 B2* | 8/2020 | Baker | G09B 19/00 |
| 10,795,973 B2* | 10/2020 | Baker | G09B 19/0053 |
| 11,135,374 B2* | 10/2021 | Baker | A61M 5/31573 |
| 2008/0243142 A1* | 10/2008 | Gildenberg | G16H 30/40 |
| | | | 606/130 |
| 2013/0266919 A1* | 10/2013 | Baker | G09B 19/00 |
| | | | 434/262 |
| 2014/0212864 A1* | 7/2014 | Rios | G09B 23/285 |
| | | | 434/270 |
| 2014/0322682 A1* | 10/2014 | Baym | G09B 5/02 |
| | | | 340/5.6 |
| 2015/0100024 A1* | 4/2015 | Baker | A61M 5/3287 |
| | | | 434/262 |
| 2015/0170545 A1* | 6/2015 | Baker | G09B 23/285 |
| | | | 434/262 |
| 2015/0206456 A1* | 7/2015 | Foster | G09B 23/30 |
| | | | 434/262 |
| 2015/0262512 A1* | 9/2015 | Rios | G09B 23/28 |
| | | | 434/262 |
| 2015/0379899 A1 | 12/2015 | Baker et al. | |
| 2016/0193428 A1 | 7/2016 | Perthu | |
| 2016/0367766 A1* | 12/2016 | Baker | A61M 5/427 |
| 2017/0004737 A1* | 1/2017 | Baker | G09B 23/285 |
| 2017/0357776 A1* | 12/2017 | Baker | G09B 19/0053 |
| 2020/0214625 A1* | 7/2020 | Hooven | A61B 5/444 |

* cited by examiner

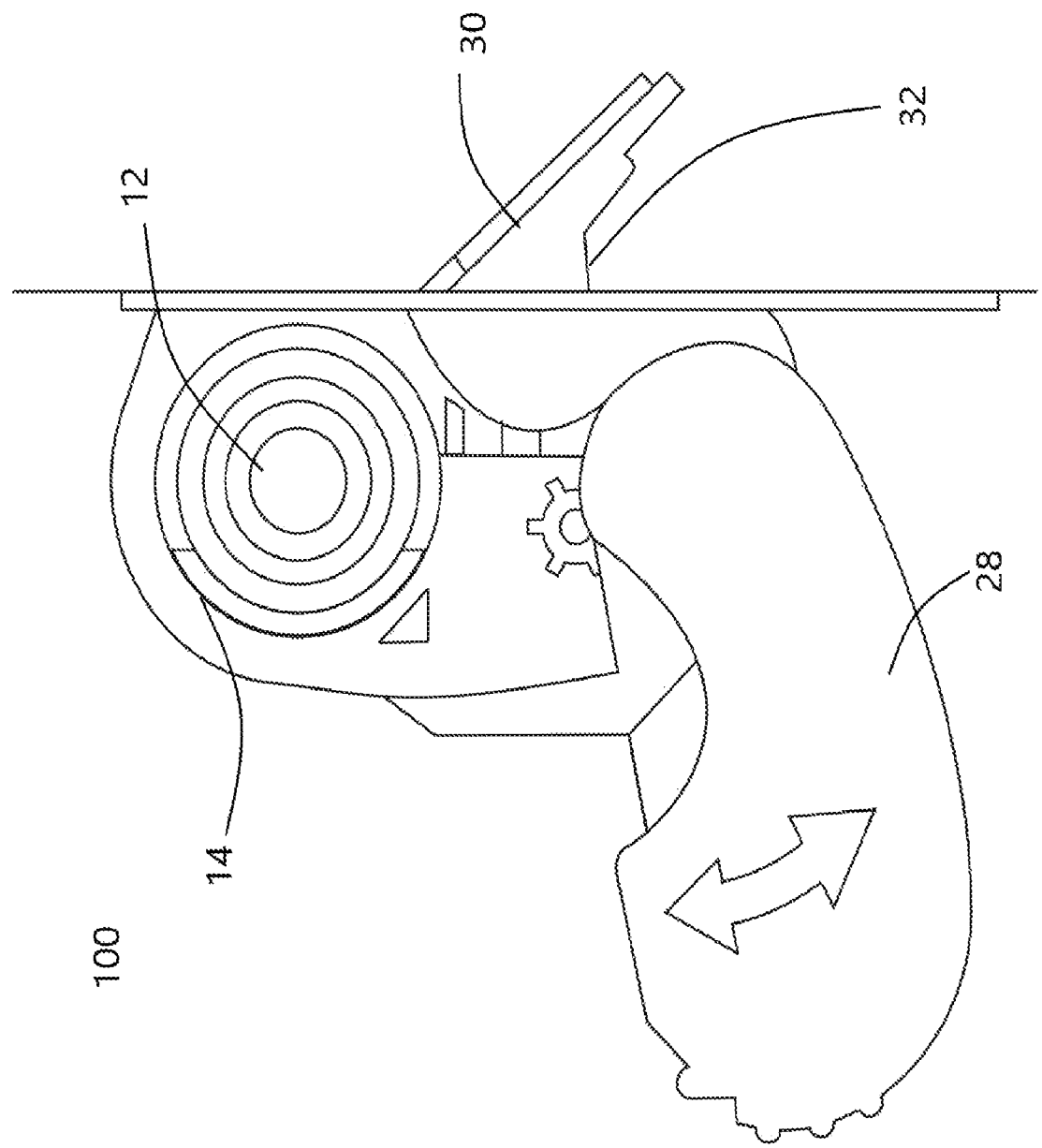

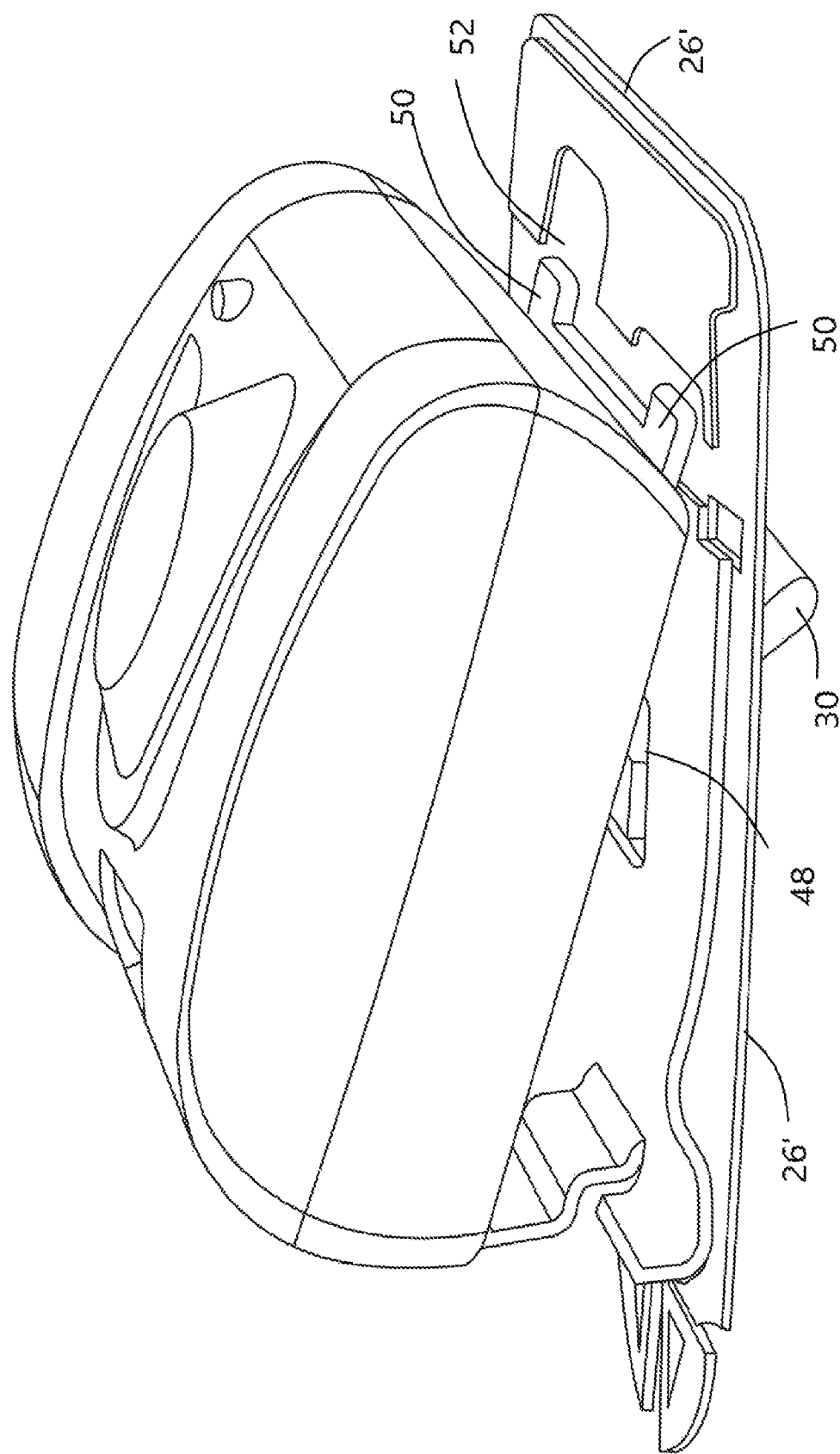

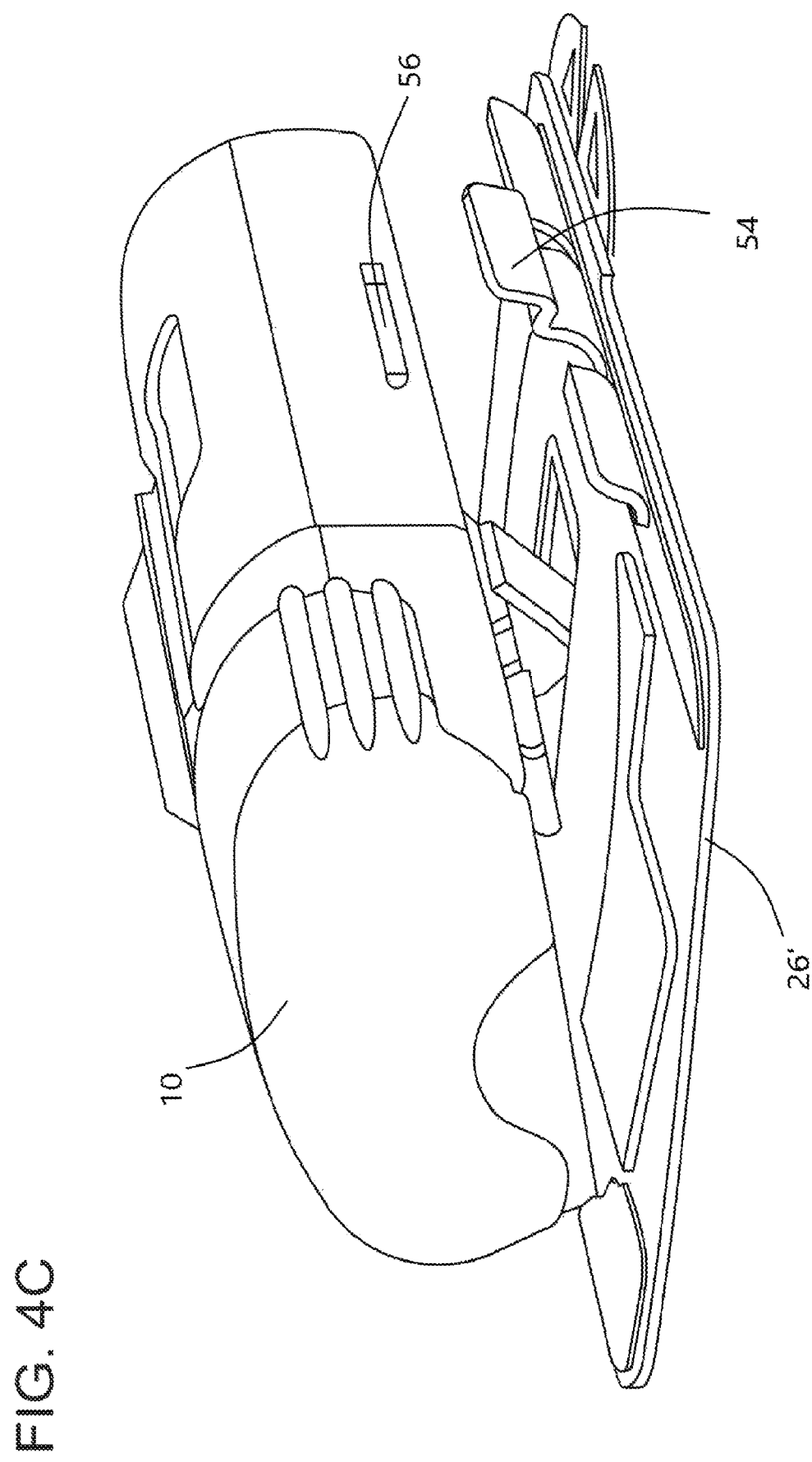

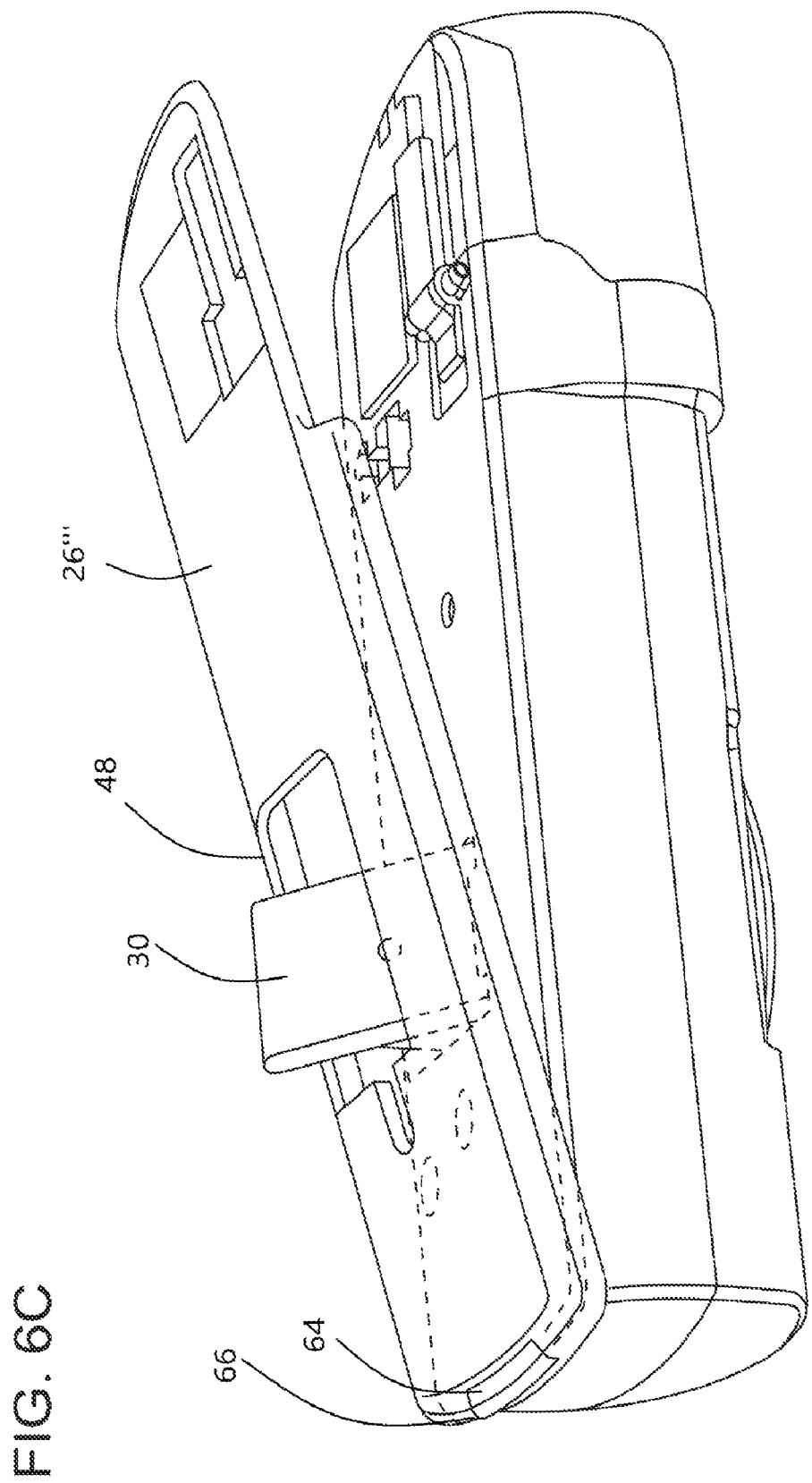

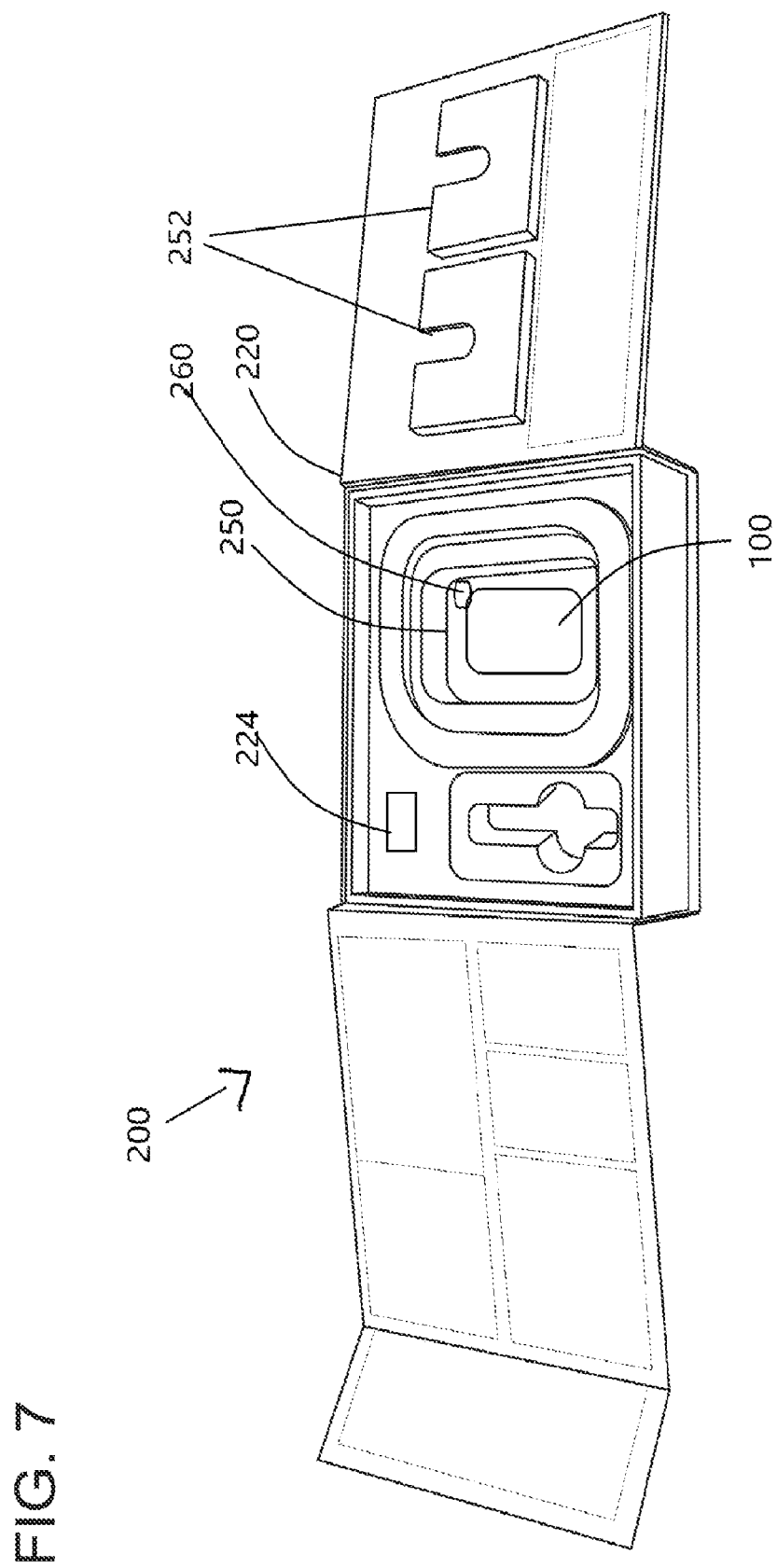

INJECTION TRAINING DEVICE

BACKGROUND

Injectable therapies are delivered in a number of methods, by prefilled syringe, auto-injection, or infusion, for example. Some subcutaneous and intradermal syringe infuser assemblies provide infusion from a prefilled syringe within the device. Patch pumps typically deliver compounds subcutaneously. Examples of these patch pumps include insulin patch infusers or other infusion devices containing needles. Wearable injection devices for controlled delivery of therapeutic agents are on the rise; however, there are limitations to these devices. Wearable patch pumps typically require the user, prior to administration of the therapeutic, to manually fill the pump by using a syringe or a vial. Most wearable patch pumps are not cost-efficient due to the design of the device providing medicament delivery. Auto injection devices are also used for subcutaneous therapeutic delivery, and are often more cost effective than wearable patch pumps; however, while these devices are typically lower in cost than other subcutaneous delivery devices, and are also typically easier to use, they are limited in terms of the type and amount of therapeutic they can deliver in one administration. Auto injectors cannot be used for the delivery of highly viscous medicaments, due to the short injection time available with an auto injection device. Injection volume is also limited by the ability of the subcutaneous tissue to receive a rapidly injected compound without pain due to the tissue distension, particularly when the compound has a high viscosity.

In addition to the abovementioned setbacks and difficulties often found with injectable therapies, perhaps the most concerning aspect related to injectable therapeutics relates to the user's ability to deliver an injection, and deliver it effectively. Many injectable therapeutics are self-administered, and there is often a stigma with self-delivery of an injectable medication. Needle-anxiety and fear of failing to deliver a complete dose, inability to operate the dose-delivery device correctly, fear of accidental needle stick during manipulation of the dose delivery device, among other concerns, in users without any medical knowledge, or with medical training, can create a barrier to effective parenteral therapy. Furthermore, incorrect placement of the device on the target injection site on the user can prevent a user from obtaining an accurate dose of medicament, or can cause malfunctions in the device itself, resulting in noncompliance with the therapeutic regimen.

BRIEF DESCRIPTION

FIG. 1 includes a top view of an embodiment of an injection training device.

FIG. 2 includes a side view of the injection training device embodiment of FIG. 1.

FIG. 3A includes a top view of an embodiment of an injection training device.

FIG. 3B includes a partial perspective side view of an injection training device showing a flap portion, and a portion of a receptacle.

Figure 4B:
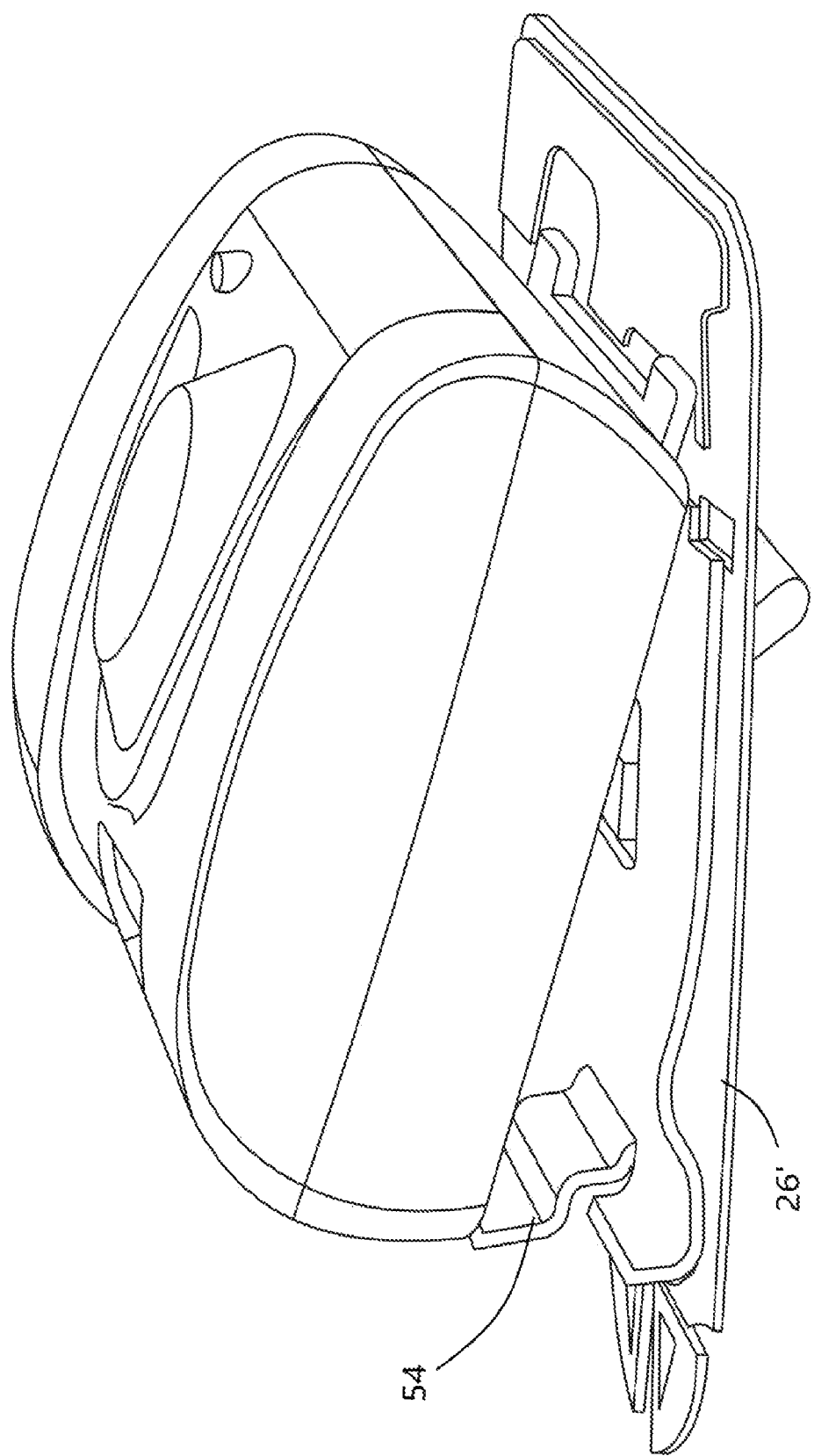
FIG. 4A is a side view of an embodiment of the injection training device 100 with contact substrate associated therewith.
Figure 4D:
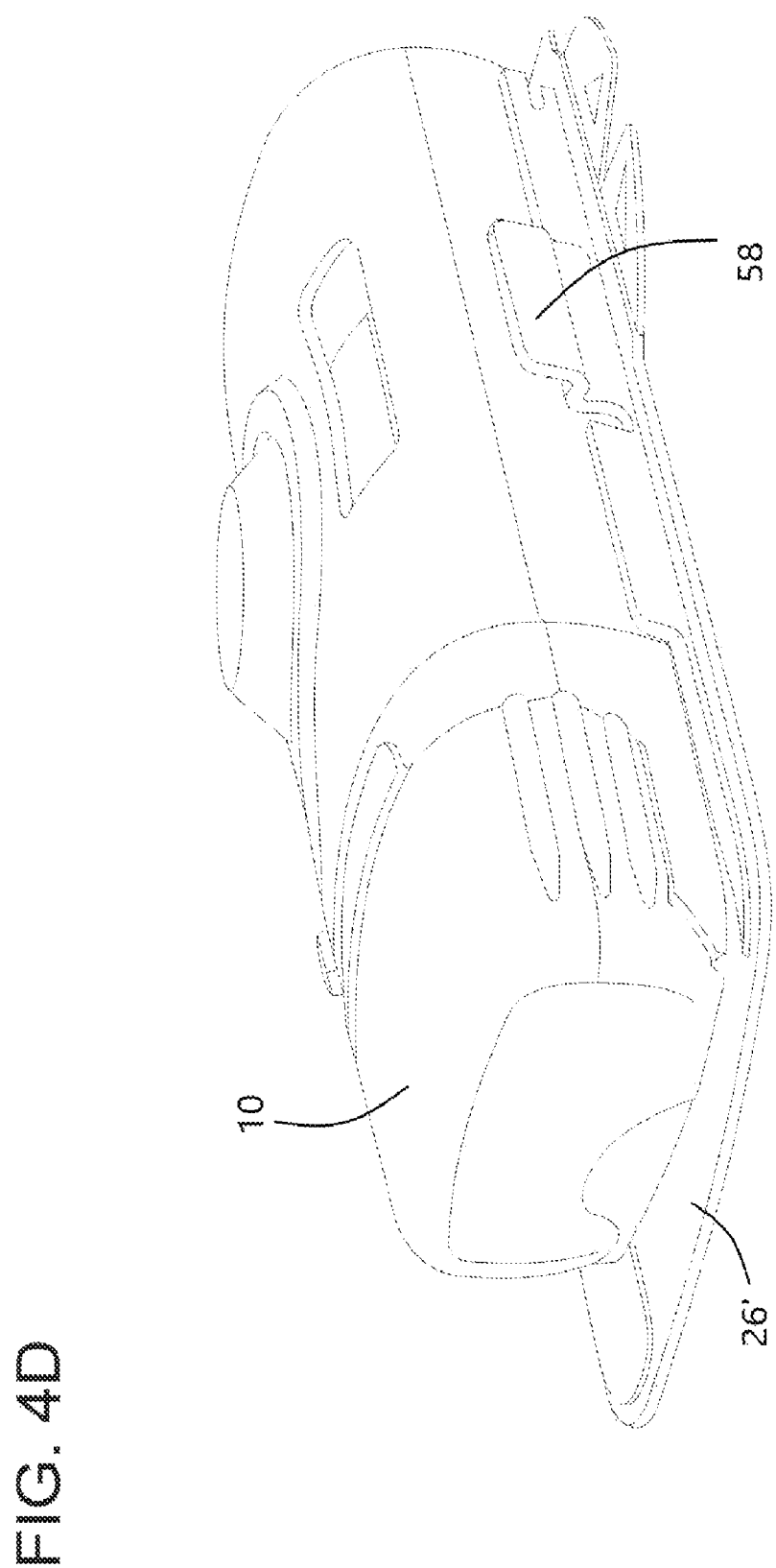

FIGS. 4B-4D provide perspective views of steps for attaching a contact substrate onto a housing of an embodiment of an injection training device.

Figure 4E:
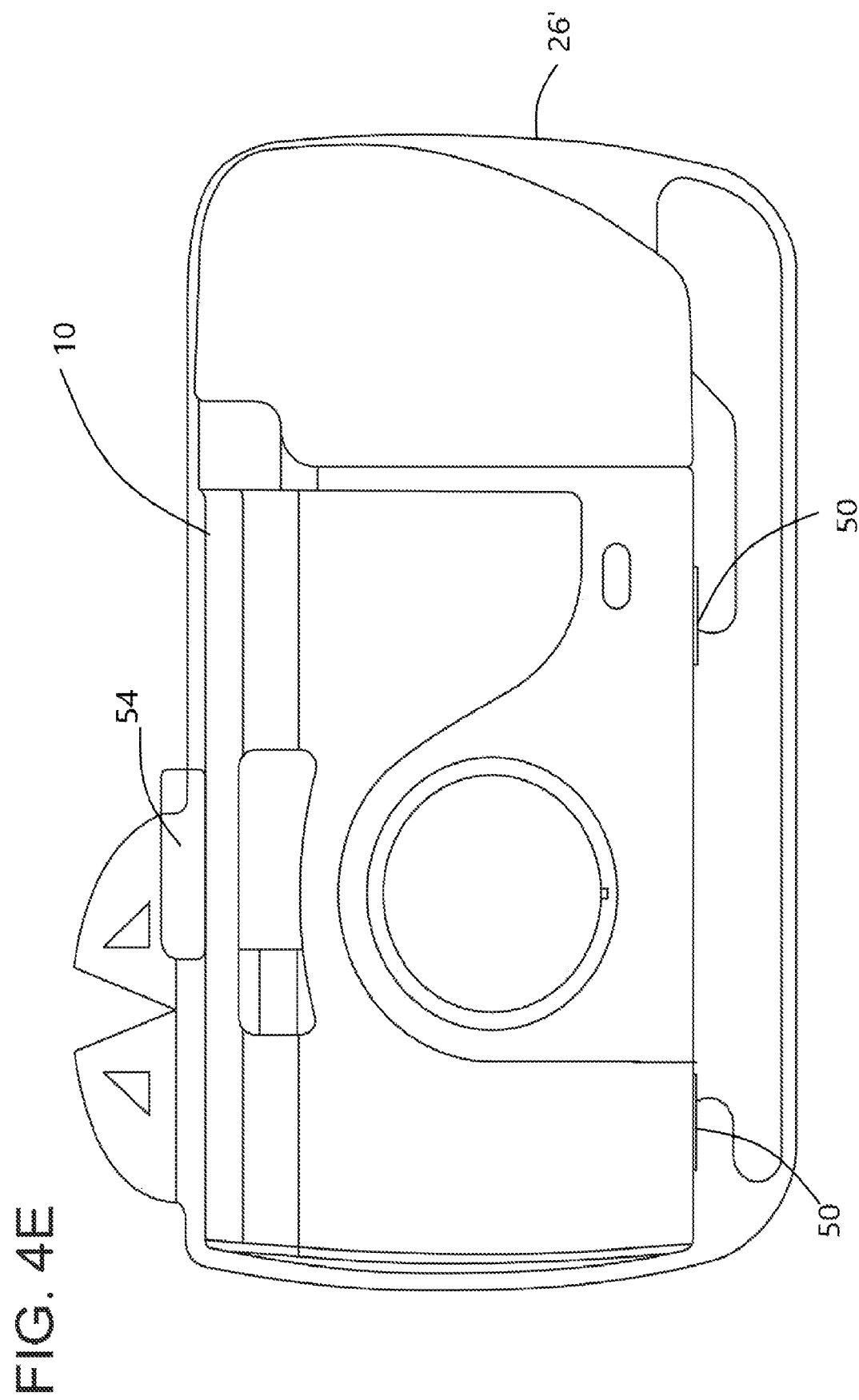
Figure 4F:
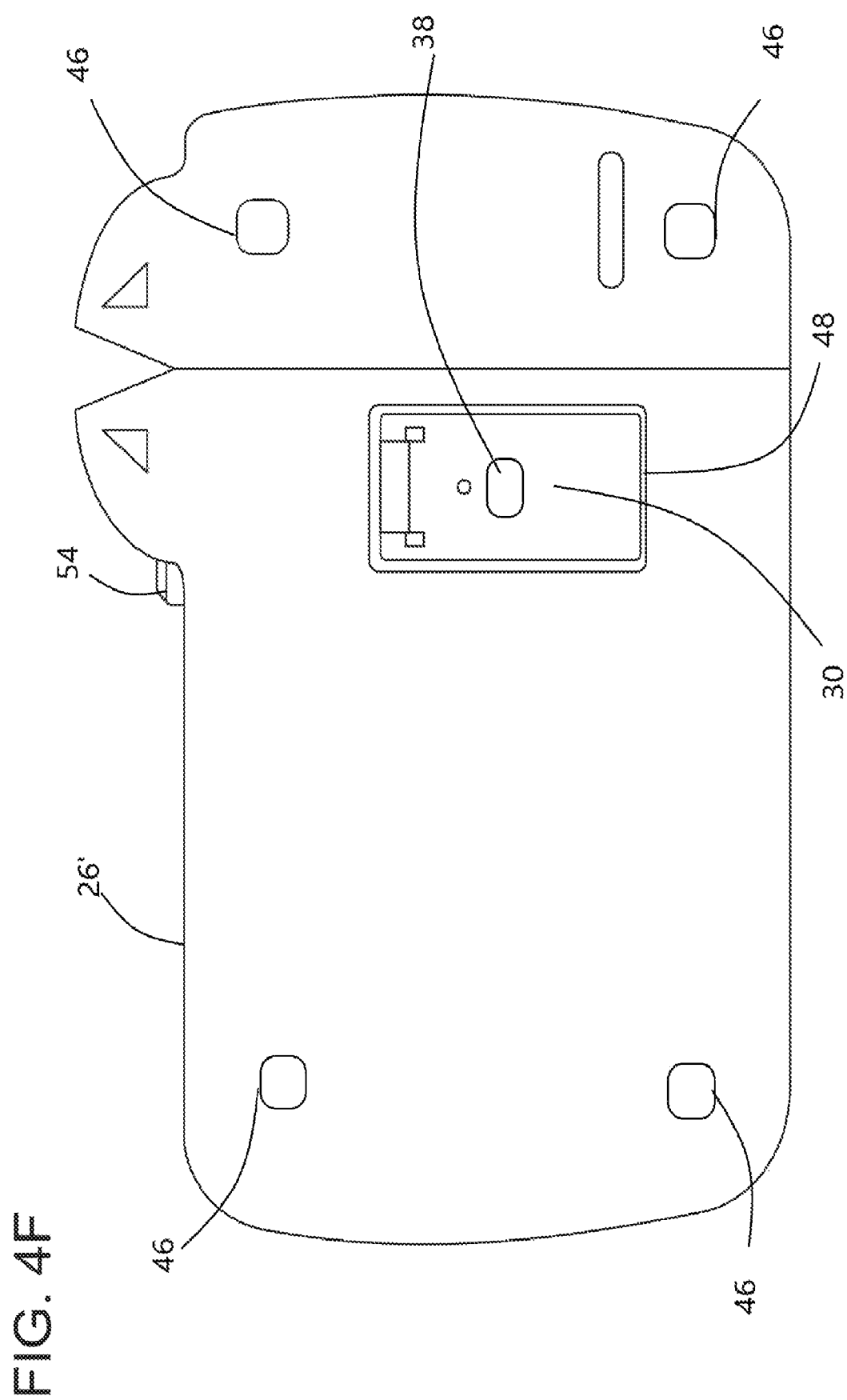

FIGS. 4E-F provide a top view and a bottom view of the embodiment of the injection training device shown in FIGS. 4A-D.

Figure 5A:
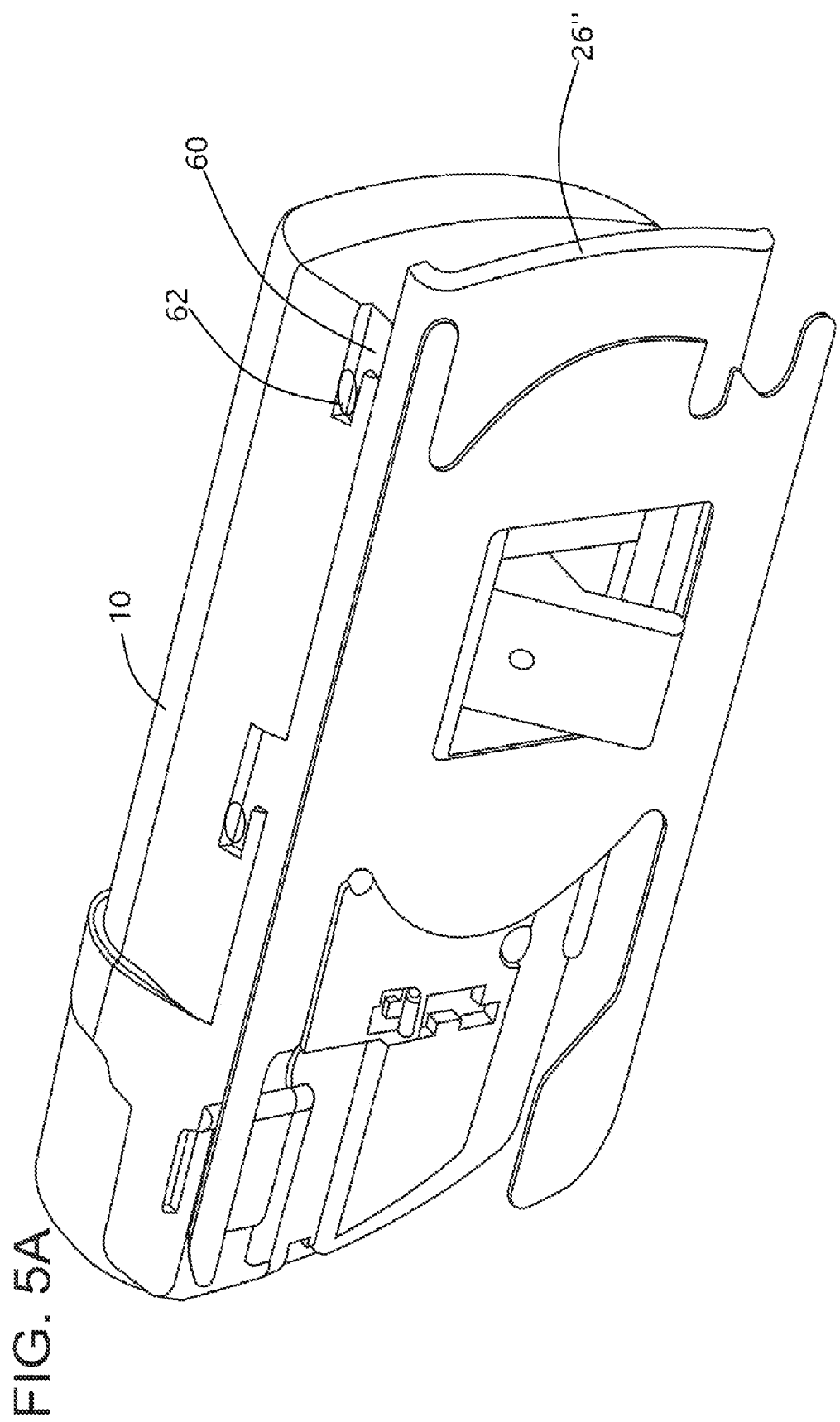
Figure 5B:
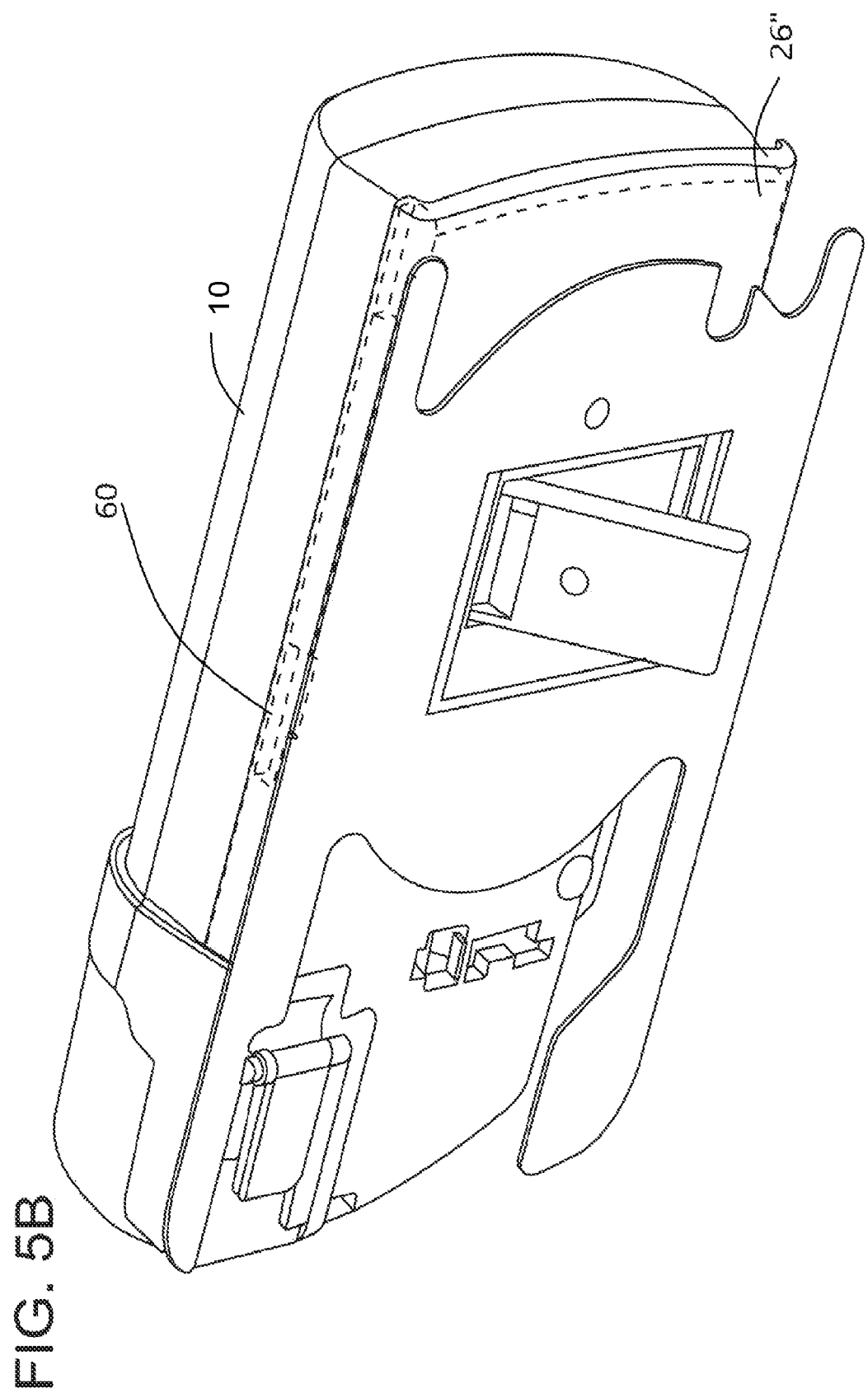
Figure 5C:
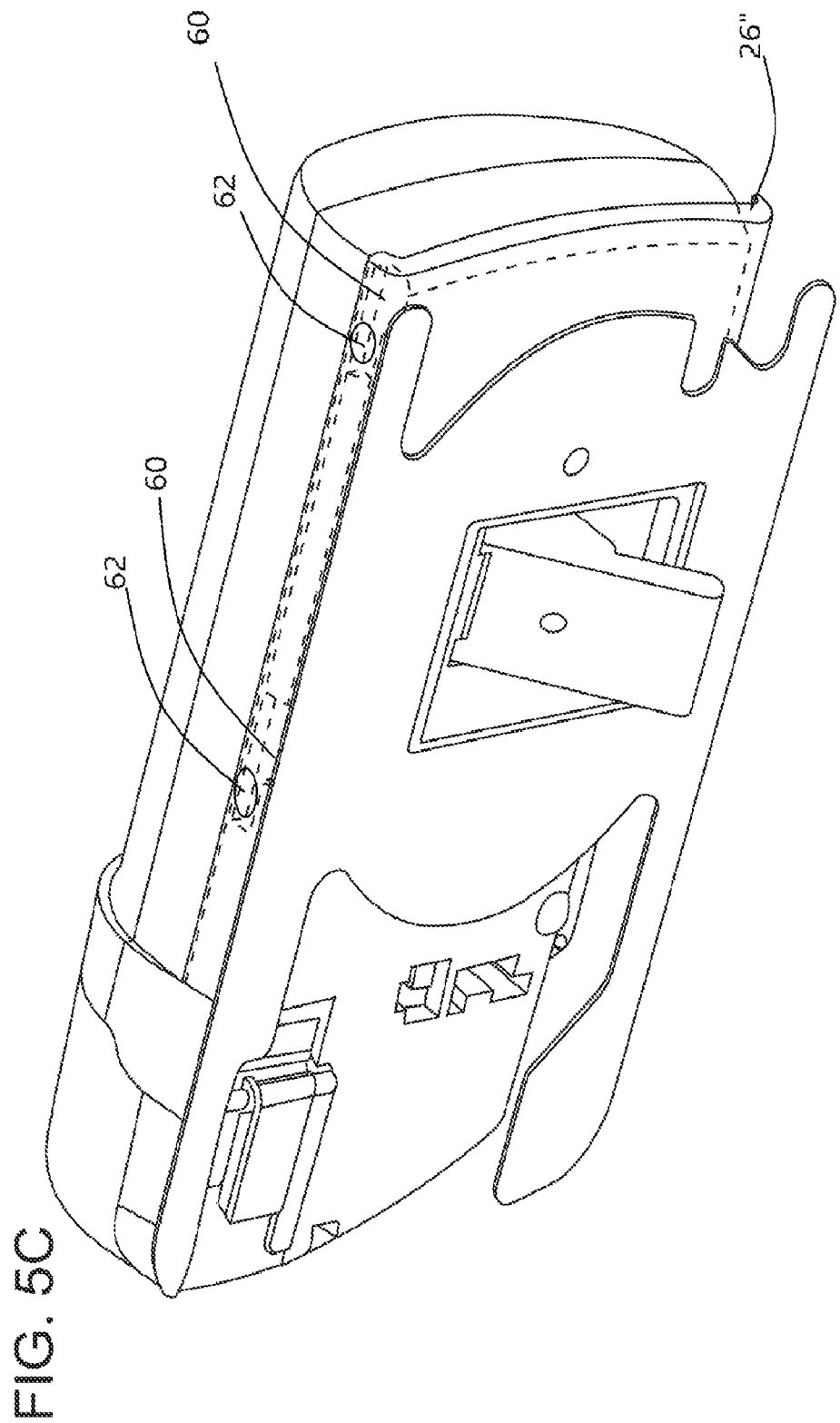

FIGS. 5A-C provide perspective views of steps for attaching a contact substrate onto a housing of an embodiment of an injection training device.

Figure 5D:
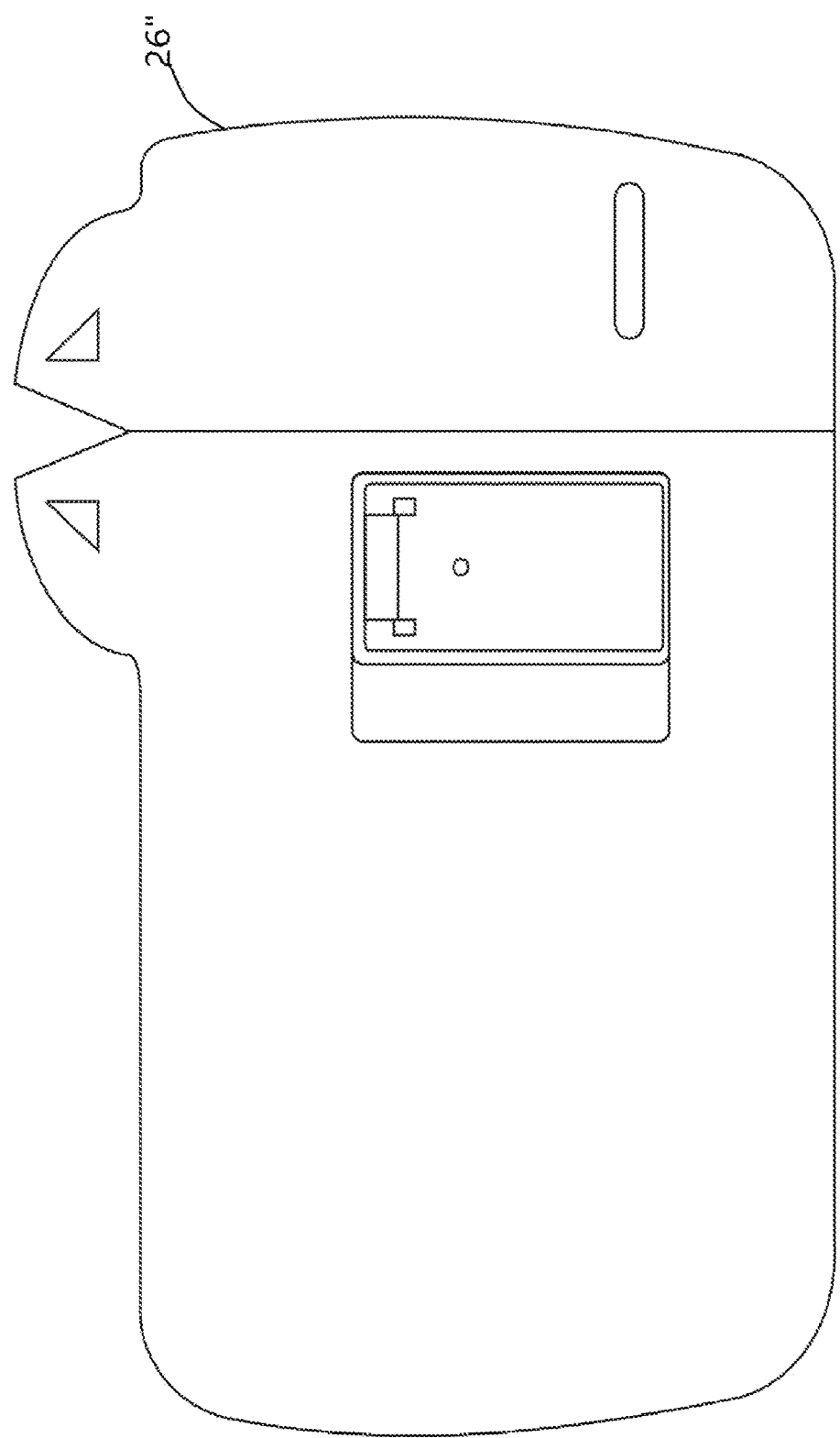

FIG. 5D provides a bottom view of the embodiment of the injection training device shown in FIGS. 5A-C.

FIGS. 6A-D provide perspective views of steps for attaching a contact substrate onto a housing of an embodiment of an injection training device.

Figure 6A:
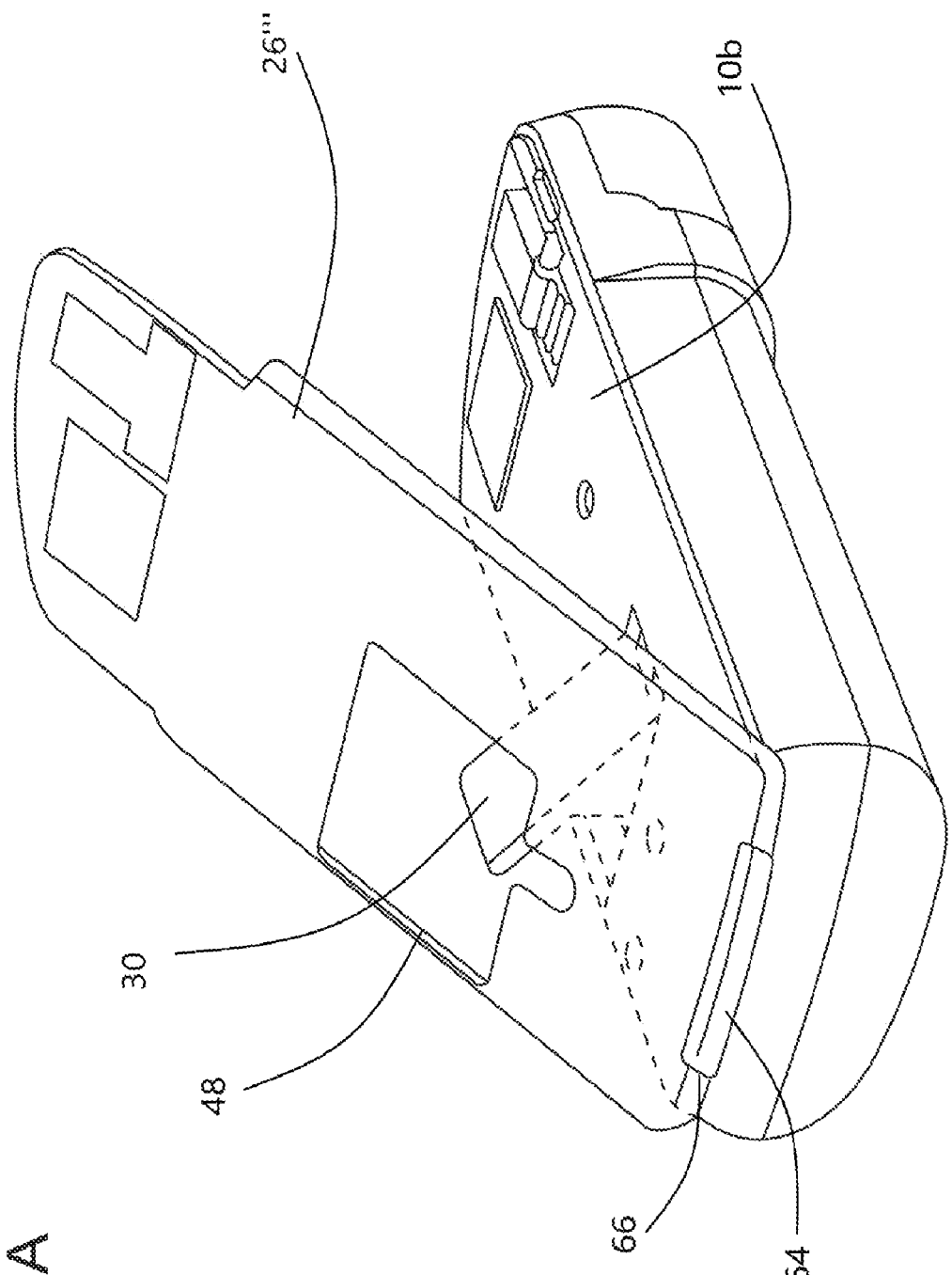
Figure 6B:
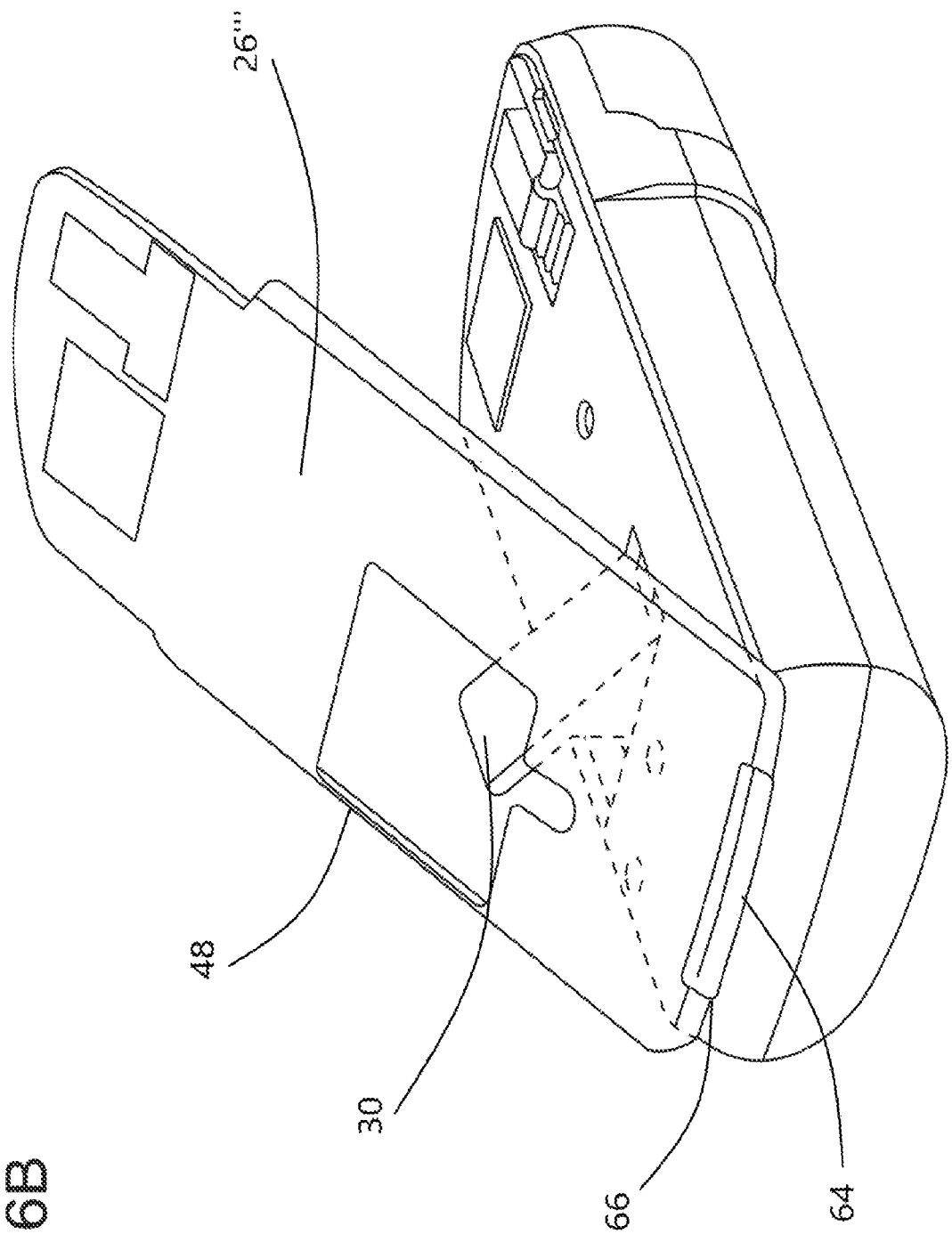
Figure 6D:
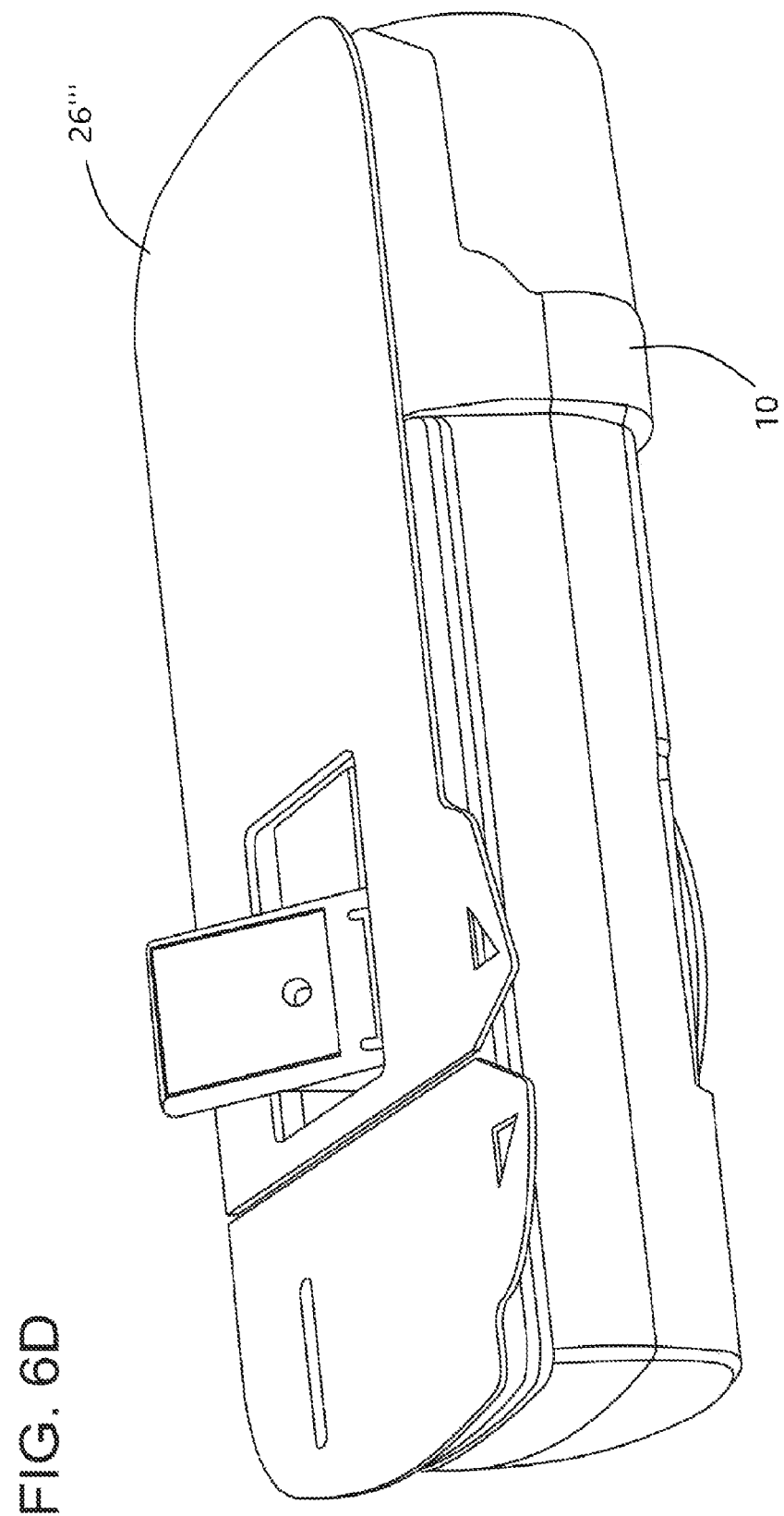
Figure 6E:
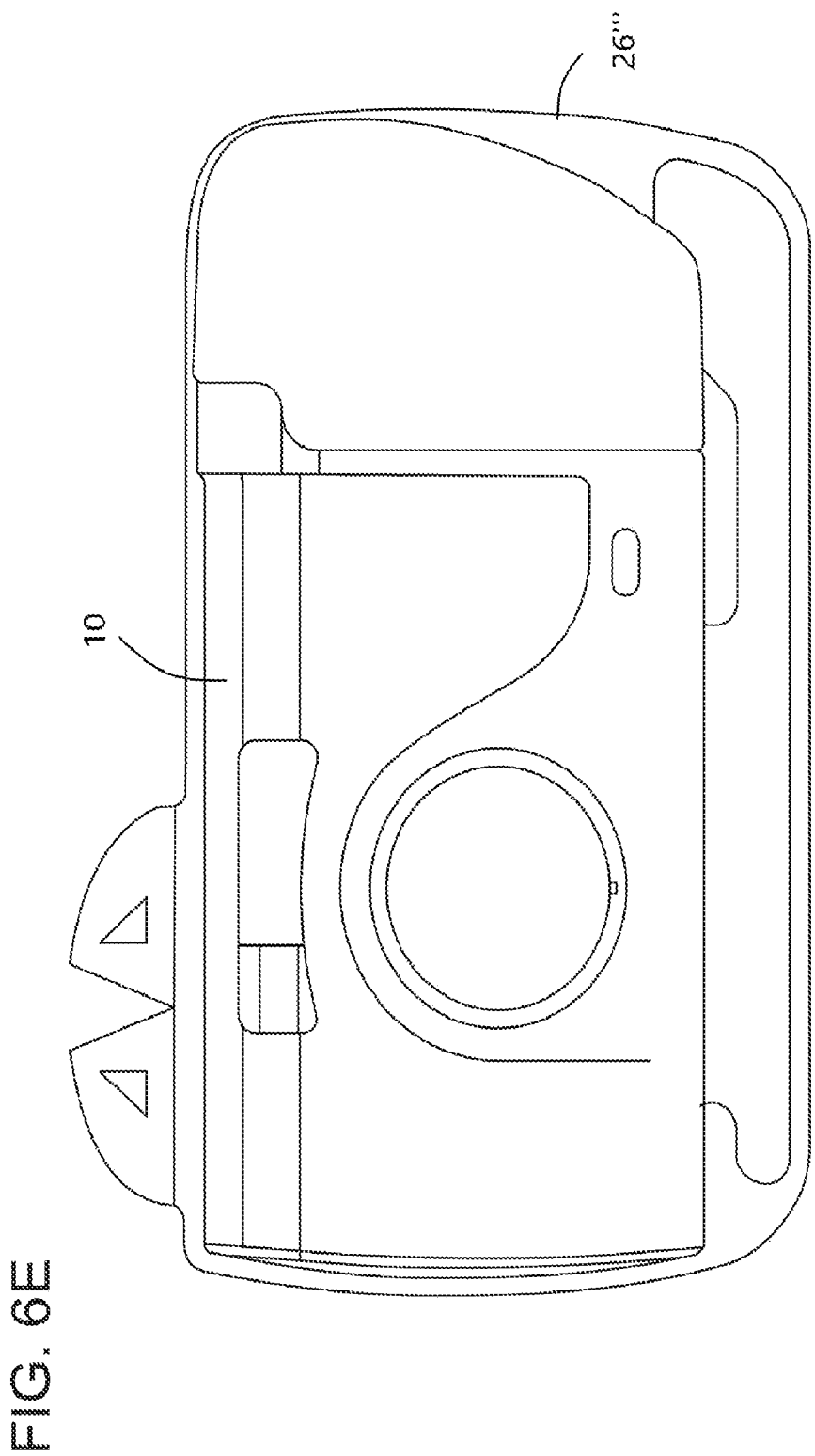

FIG. 6E provides a top view of the embodiment of the injection training device shown in FIGS. 6A-D.

Figure 6F:
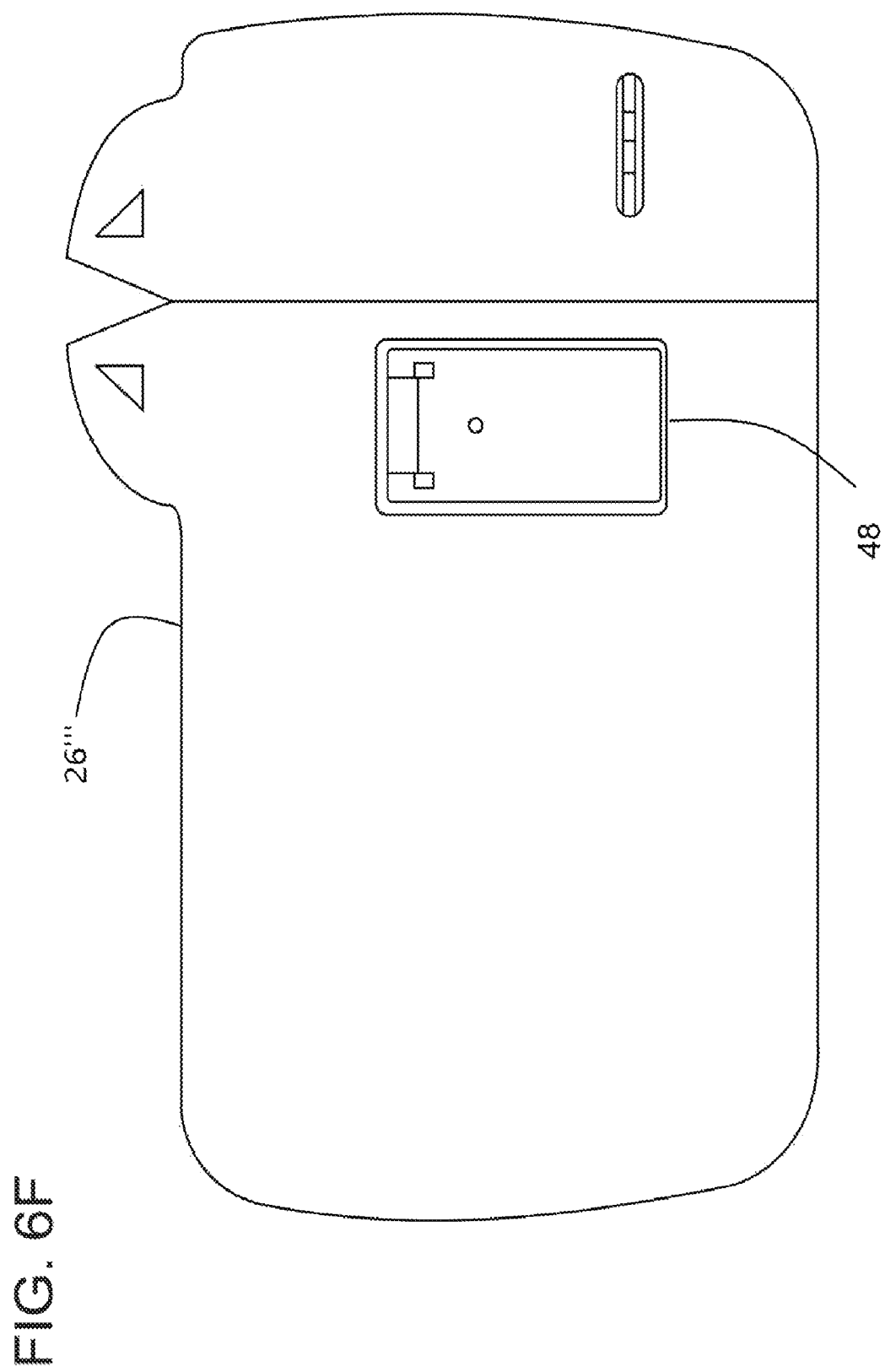

FIG. 6F provides a bottom view of the embodiment of the injection training device shown in FIGS. 6A-E.

FIG. 7 includes a perspective view of an injection training system embodiment including an injection training device embodiment associated therewith.

DETAILED DESCRIPTION

It has been identified herein, that the use of a training device can greatly reduce, or eliminate any fears or anxieties associated with parenteral drug delivery. Inventors have discovered herein an injection training device that simulates an injection event and provides guidance to a user during the injection training. In non-limiting embodiments further described herein, the injection training device detects conditions of the device and of the user's use thereof before, during and after an injection training event, and may provide feedback on the conditions detected. The injection training device may further receive and/or transmit data related to a training, a user, a medicament, or use of the device, among other data, in some non-limiting embodiments. The conditions detected by the training device may include correct and/or incorrect use of the device, or correct or incorrect device function.

For the purposes of promoting an understanding of the principles and operation of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention pertains.

It is to be noted that the terms "first," "second," and the like as used herein do not denote any order, quantity, or importance, but rather are used to distinguish one element from another. The terms "a" and "an" do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising." The modifier "about" used in connection with a quantity is inclusive of the stated value and has the meaning dictated by the context (e.g., includes the degree of error associated with measurement of the particular quantity). It is to be noted that all ranges disclosed within this specification are inclusive and are independently combinable.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. As a non-limiting example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 7.

The term "sensor" or "sensors" as used herein may include but are not limited to, light sensors, fluid flow rate sensors, strain gauge sensors, temperature sensors, pressure sensors, tilt sensors, force sensors, level sensors, contact sensors, photoelectric sensors, magnetic sensors, ultrasonic sensors, electrochemical sensors, acceleration sensors, moisture sensors, humidity sensors, speed sensors, inductive sensors, capacitive sensors, and orientation sensors. Some of these sensors may require a supply of voltage. The injection training device may include one or more of the sensors described herein, for example, a contact sensor may be used to detect whether the receptacle closure is open or closed over the opening of the receptacle, for example. In another non-limiting embodiment, a contact substrate sensor may be used to detect whether the removable layer is in contact with or is not in contact with the contact substrate. In some further, no limiting examples, the term sensor may be used to describe a switch used to detect a change in condition, for example, a contact switch. The term "sensor for detecting contact" as used herein may include a sensor for detecting a fixation to a target site, for example, a contact sensor, a light sensor, or another sensor which may detect whether contact exists or fails to exist between the device or a portion of the device, and a contact surface, i.e., the contact site of a user, for example.

In a further example, two or more sensors may be used to detect various features and/or conditions of the device or use thereof. In one embodiment, those sensors may include sensors for detecting contact (see FIG. 4F), in other embodiments, a sensor for detecting contact and another sensor may be provided. In one non-limiting example, a sensor may include a microphone configured to detect sound and provide functionality and/or feedback to the user based thereon. In one example, a sensor for detecting contact and a microphone may be used in combination to detect removal of the device prior to completion of an injection training event. In this embodiment, a wet injection error may be detected, and appropriate feedback may be provided to the user. The microphone may detect one or more device or system sounds, such as the movement of one or more mechanical components of the device or system relative to one another. For example, the microphone may detect the sound of actuation of the actuation member indicating initiation of an injection training event. In another example, the microphone may detect movement of a retractable injection simulation member to indicate completion of the injection training event. An example of an inductive sensor includes material embedded in or associated with the device, wherein said embedded or associated material proportionally changes the magnetic field of the inductive sensor which may be associated with or embedded in the container, in one non-limiting example, depending on its distance away from the inductive sensor. In one non-limiting embodiment, an inductive sensor or a contact sensor may be associated with the injection simulation member described in embodiments herein in order to determine contact with the user, or in other examples, to determine contact with a particular area of a user. The one or more sensors may be used to detect tissue-specific contact, in some no-limiting embodiments. The sensor then outputs a variable electrical signal based on the distance between the embedded or associated material and the inductive sensor. The embedded or associated material may be embedded in or associated with the container, and the inductive sensor positioned in the injection training device, at or near the receptacle, for example, or vice versa.

The term "smart device" as provided herein includes define to includes a Smartphone, a tablet, a computer, or other digital assistant. The term "remote device" as provided herein includes smart device and also includes a package for interfacing with the training device, cellphone, medical office, database, caregiver device, and a remote computer.

The term "agitator" as used herein includes, in one embodiment, a device or a portion thereof, used to simulate a sensation felt by a user during an injection without puncturing the skin of the user. In some non-limiting embodiments, an agitator may be formed so as to create a sense of pain or discomfort in a user without damaging the target surface of the user.

The term "communicatingly connected" as used herein may include a wired or a wireless connection, wherein said connection provides a communication of power and/or information between the injection training device and a remote device or smartphone, or between the injection training device and a cooperative package. In some non-limiting embodiments, communication between the injection training device and the package, for example, may include a one-way communication of power and/or information from the injection training device to the package, or from the package to the injection training device, and two-way communication of power and/or information to and from the injection training device and the package.

The terms "associated" or "association," as used herein, includes but is not limited to direct and indirect attachment, adjacent to, in contact with, partially or fully attached to, and/or in close proximity therewith.

In one non-limiting embodiment, the wireless connection includes a Bluetooth® and/or an RFID (Radio Frequency Identification) technology. In a further embodiment, the RFID technology includes an RFID transponder and an RFID reader. In another non-limiting embodiment, the RFID transponder is associated with the injection training device and the RFID reader is associated with the package, the package includes the power source, such that the RFID reader of the package can power the injection training device by way of the RFID transponder, for example.

The RFID transponders, or tags, described herein may be active, semi-active or passive and may include a microchip and an antenna. The active and semi-active RFID transponders may additionally include a battery, in a non-limiting example.

In another non-limiting embodiment, the RFID transponder is associated with the package and the RFID reader is associated with the injection training device wherein the device includes the power source, and wherein the RFID reader of the device powers the package by way of the RFID transponder.

In a further embodiment, the medicament system is provided wherein one of the package or the injection training device comprises a unique identification component. The unique identification component may include, in non-limiting embodiments, information about a medicament, the medicament device or training device, use of the training device, or information about the package, or any other information which would be known to one of ordinary skill in the art. The other of the package or the injection training device may include a unique identification reader, wherein the unique identification reader is configured to read information on or associated with the unique identification component, in an embodiment. In one non-limiting embodiment, the unique identification component may include a bar code and the unique identification reader may include a bar code reader, for example.

As described in embodiments herein, a training device, system and method, for simulating an injection event, wherein the device is for attachment to a person during the injection simulation event is provided. The device, in some embodiments, comprises a housing, an injection simulation member configured to simulate a needle, and an attachment mechanism for securing the device to a target or contact site of a user. The embodiments described herein may be used to train a user to correctly manipulate and attach the device to a target site to simulate effective delivery of an injection. Sensors, switches, and in some instances, feedback is provided to guide a user through the simulation or training process. In some non-limiting embodiments herein, the device and systems described herein may simulate an abbreviated dosing event as compared to the actual dosing regimen conducted with a medicament-delivery device. In some medicament-delivery devices for use as drug pumps used to deliver medicaments containing large molecules which cannot be digested when administered orally, for example, the device is adhered to the patient, and the medicament is delivered by way of a needle inserted into the patient. The medicament can be delivered, in this means, to the patient slowly, over time. In some examples of medicament-delivery devices, the needle may be substantially perpendicular to the syringe axis while penetrating the skin of a user.

To effect adequate simulation, embodiments included herein provide, for example, an injection training device having a housing, an actuation member, a sensor, and an attachment mechanism for securing the device to a user. In some non-limiting embodiments, these devices may include a housing which defines a receptacle having an opening, the receptacle for receiving a container, configured to mimic a medicament-containing container in a drug-delivery device. In other, non-limiting embodiments, the housing may not include a receptacle for receiving a container, and may simulate drug delivery devices without removable containers. In embodiments in which a removable container is provided, a sensor is provided on a portion of the housing to detect receipt and/or removal of the container from the receptacle. In one non-limiting embodiment, a sensor may be placed within the receptacle to monitor correct placement of the container within the receptacle. In some embodiments, this sensor may include a contact sensor, a light sensor, a proximity sensor, or the like. A further aspect of the device may include a receptacle closure member, i.e., a door, which serves to selectively allow access to or prevent access to the receptacle by moving relative to the opening. In one non-limiting embodiment, a receptacle closure member sensor may be provided to detect whether the receptacle closure member is engaged (closed over the opening) or disengaged from the opening allowing access to the receptacle for placement or removal of the container.

In some non-limiting embodiments, the device or system may include a processor configured to receive signals from one or more sensor inputs and/or to receive and/or send information to and from the device. The processor may provide instructions for use of the device. These instructions may include stepwise instructions. In some embodiments, the device may provide feedback to a user before, during, or after use of the device in the form of positive reinforcement, corrective feedback and/or error indications. Error conditions may be detected in the use of the device by sensor input, in some non-limiting embodiments.

In other non-limiting embodiments, the device may include an actuation member to initiate actuation of the device. In a further embodiment, actuation of the actuation member may initiate the injection simulation. In other embodiments, the training or simulation may be initiated by another component of the device or system. In some non-limiting embodiments, the device may include an actuation member sensor configured to detect when the actuation member has been activated. In other non-limiting embodiments, the device may not include an actuation member, but may be activated by compressing the device housing against the target area of the user to simulate the injection.

In one non-limiting embodiment the device may include sensors which detect placement on a target or contact surface of a user. One particular non-limiting embodiment may include sensors to detect contact on a surface of a user, and an actuation member sensor, wherein the device or system may detect if the device is removed from the target surface of the user following initiation of an injection training, but prior to completion of the injection training. Such a detection may result in an error condition. The device may be able to detect that the housing was removed from the target area following actuation of the actuation member, but prior to completion of the training. In an embodiment, the completion of the training may be determined by the indication of a sound from the device that may be detected and/or recorded by the microphone, for example, or the completion of the injection training may be indicated by a timekeeping component of the device or system based on the time the actuation member is actuated, in one non-limiting example. This data may be processed by the processor.

In some non-limiting embodiments, the housing comprises a front portion, and a back portion. The back portion may include, or may be associated with an attachment mechanism, which may include or be associated with, in one non-limiting embodiment, a contact substrate. The contact substrate may be configured to attach onto a portion of the user. In one non-limiting example the contact substrate may include an adhesive layer which may be removed from the contact substrate prior to use. There may be one or more sensors which may detect contact between the adhesive layer and the contact substrate, in one embodiment. The contact substrate may be removable and replaceable from the housing for subsequent training events. In one embodiment, the contact substrate may adhere onto the device by way of a hook and loop attachment. In other examples, tabs may interlock with openings to affix the contact substrate onto the housing for adherence of the device onto a user (see. Many of these portions of the device may be replaceable to promote repeated trainings with the device or system.

In some non-limiting embodiments of the system or the device herein, a signal output component may be provided, which may include one or more lights, one or more speakers, one or more vibration components, or the like, configured to signal to a user. The signal output component may be provided on the injection training device or the package, or both, in some embodiments, and may provide information to the user, for example, that a simulated dose of medicament (or an injection training event) has been completed. One stimuli, i.e., light, sound, smell, vibration, may be provided to signal to a user, or a combination of stimuli may be used to provide a user signal via the signal output component.

Figure 1:
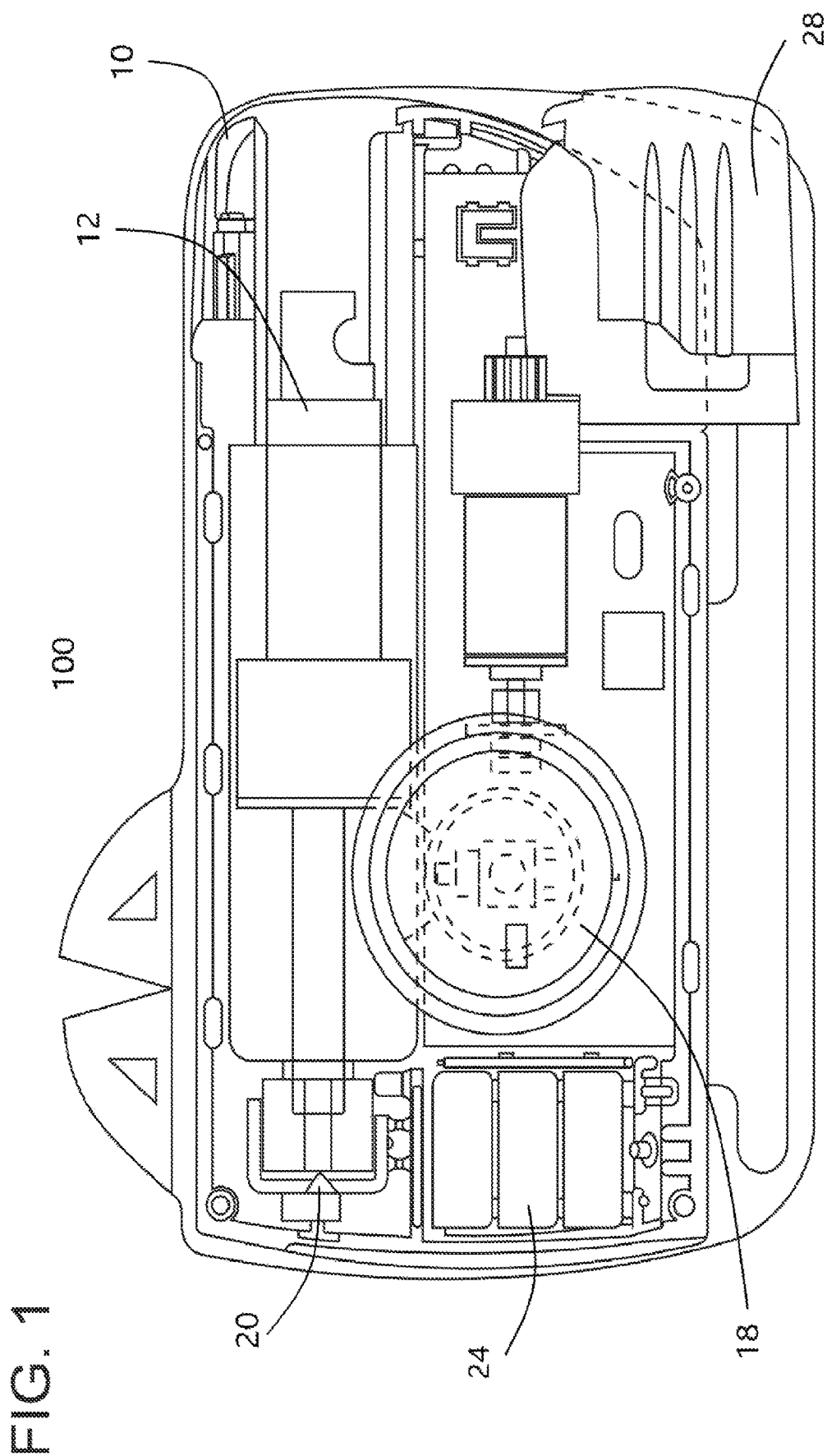

In a first non-limiting embodiment, shown in FIG. 1, an injection training device 100 including a housing 10 defining a receptacle 12 having an opening 14 is provided (opening shown in FIG. 2). The non-limiting embodiment further includes a removable container 16 (not shown), receivable within the receptacle 12, and an actuation member 18 configured to simulate actuation of an injection device, at least one sensor comprising a container sensor 20 for detecting receipt and/or correct seating of the removable container 16 (not shown) within the receptacle 12, and a processor 22 (not shown). The injection training device 100 detects a condition of the device 100 and, optionally, provides feedback based on the condition detected, and wherein the housing 10 is configured to be affixed to a contact site of a user for an injection training event. In one non-limiting embodiment, a power source 24 may be associated with the device 100. The power source 24 may include batteries as shown in FIG. 1. In some non-limiting embodiments, the device 100 may further include a receptacle closure member 28. The receptacle closure member 28, also shown in FIG. 2, may be provided for securing an entrance to the opening 14. In a further non-limiting embodiment, the device may include an injection simulation member 32 (not shown), configured to simulate a needle in a medicament delivery device. The injection simulation member 32 may be movable relative to the device 100 and may be delivered from the device 100 to contact a user upon actuation of the actuation member 18.

Figure 3A:
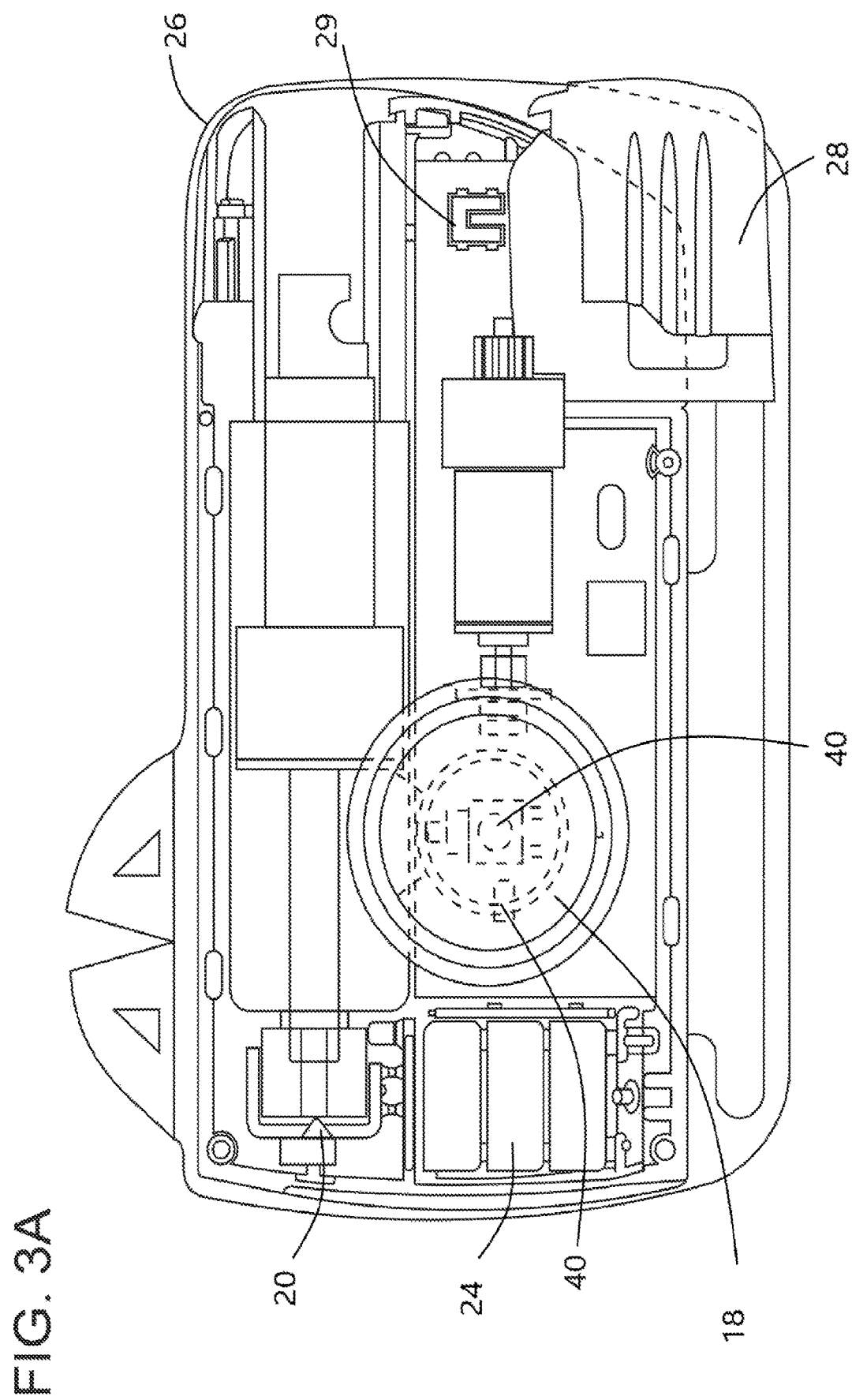
FIG. 3C is a perspective back side view of an embodiment of an injection training device 100 showing a contact substrate.
Figure 3B:
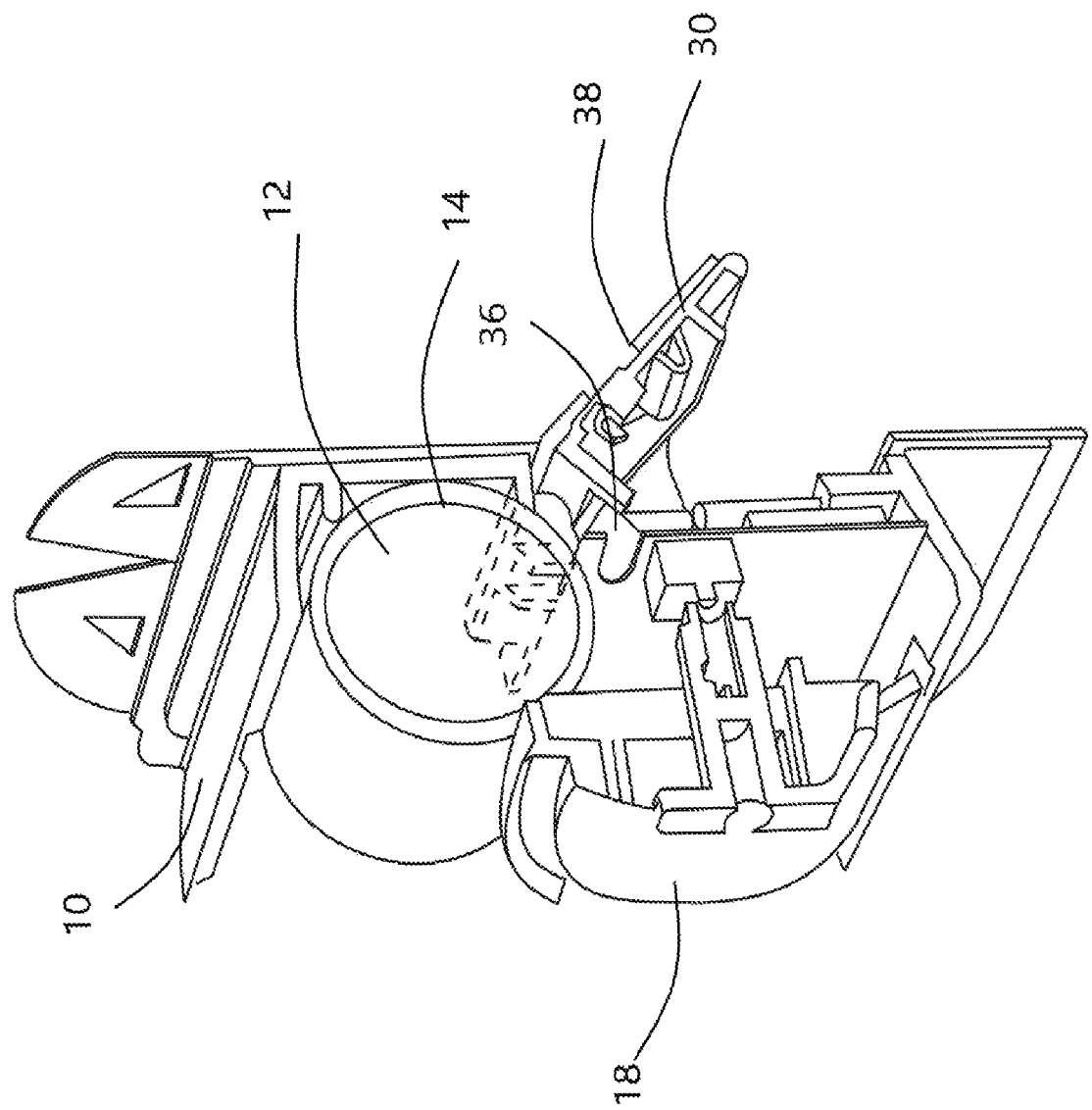

In FIG. 2, the receptacle closure member 28 is in a position to allow access to the opening 14 and to the receptacle 12. The receptacle closure member 28 may be moved relative to the housing 10 to allow access to the receptacle 12 for placement of a container 16 there within. Upon placement of a container in the receptacle 12, the receptacle closure member 28 may be secured to prevent access to the opening 14, and maintain the container 16 there within until completion of a training. In FIGS. 2 and 3B, a flap portion 30 can be seen extending from the back side 10b of the housing. The flap portion 30 abuts the contact surface of a user when the housing 10 is placed against the user during a training event. Upon removal of the device 10 from a contact site of the user, the flap portion 30 covers a portion of the injection simulation member 32 to prevent contact between the injection simulation member 32 and the user, following a training event. In another, non-limiting embodiment, the injection simulation member 32 may be retractable within the housing 10 following use of the device 100. In some non-limiting embodiments, the device 100 may not include a flap portion 30.

In one embodiment, the flap portion 30 may include an aperture 34 (see FIG. 3C) for receiving the injection simulation member 32 during a training, as the injection simulation member 32 is delivered from the device 100. The flap portion may be movable relative to the housing 10, such that upon association of the back side 10b of the housing 10 against a contact surface of a user causes the flap portion 30 to compress against the back side of the housing 10b. The flap portion 30 may be further associated with a biasing member to bias the flap portion 30 is away from the device, such that once the back side 10b of the housing 10 is removed from a target surface of the user, the flap portion 30 may bias outward from the housing to protect the injection simulation member 32, and create a barrier between the injection simulation member 32 and the user, to protect the user from access to the injection simulation member, prevent contamination of the injection simulation member and/or prevent contamination of the user from the injection simulation member. FIG. 3A further includes an actuation member sensor 40 to detect activation of the actuation member 18, a closure member sensor 29 to detect closure of the closure member 28. FIG. 3A shows more than one actuation member sensor 40 for detecting actuation of the actuation member. In other non-limiting embodiments only one sensor 40 may be used, or more than two sensors 40 may be used.

In one non-limiting embodiment, the flap portion may include a flap portion sensor 36 or switch to indicate whether the housing 10 is pressed against a user during an injection event by detecting whether the flap portion 30 is biased toward the housing 10. The flap portion 30 may also or alternatively include, for example, a sensor for detecting contact 38 between the flap portion 30 and a user, in a non-limiting embodiment, as shown in FIG. 3B. FIG. 3B provides a partial sectional side view of the device housing 10, wherein the receptacle 12 formed by the opening 14, for receiving a container is provided. Moreover, a portion of the actuation member is shown in FIG. 3B.

In other non-limiting embodiments, the device may not include a removable container, and may include instead an injection training device including a housing, an actuation member configured to simulate actuation of an injection device; at least one sensor comprising a contact area sensor for detecting contact between the device and a user; an injection simulation member configured to simulate a needle, wherein activation of the actuation member delivers the injection simulation member from the device; a processor, wherein the injection training device detects a condition of the device and, optionally, provides feedback based on the condition detected. The housing of the device may be configured to be affixed to a contact site of a user during an injection training event, such that when following actuation of the actuation member, and prior to completion of an injection training event, contact between the device and the user is not detected, an error condition is detected.

In further embodiments, the condition detected by the device may include an error condition. The error condition may include a condition of the device, an incorrect use of the device by the user, which could include an out of sequence step performed, or a step performed incorrectly, in non-limiting examples. In further embodiments, feedback provided by the device may include corrective feedback, where, for example, an error condition occurs. In other embodiments, the feedback may include positive feedback where a step is performed correctly. In a further embodiment, the device may provide stepwise instructions for using the training device. The device may detect out of sequence errors, in a non-limiting embodiment. If a step is performed out of sequence, an error condition may result and feedback may be provided based thereon. The corrective feedback may include 1) a warning that an error has occurred, and 2) guidance for correcting the error, or information about what error occurred and the correct use of the device at that step; or 2) only corrective feedback, in a non-limiting example. In other examples, error conditions may include a detection that the container is not received within the receptacle, or is not seated properly in the receptacle of the device. In another example, an error condition may include a condition in which the contact substrate is incorrectly attached onto the housing, or wherein the removable layer has not been removed from the adhesive layer of the contact substrate. In another example, an error condition may occur when the receptacle member is not closed during use of the device. An error condition may occur when a wet injection is detected during use of the training device, as described in greater detail herein. An error condition may be detected when the housing is not in correct contact with the contact site of the user during an injection training event. This may be detected by way of one or more sensors on the device, or by way of a sensor or switch associated with the flap portion. Other error conditions may also be detected such as a malfunction of the hardware or software of the device or system, in one non-limiting embodiment.

The injection training device may include a wired or wireless communication component for transmitting or receiving data to and/or from the training device and a remote device.

Figure 3C:
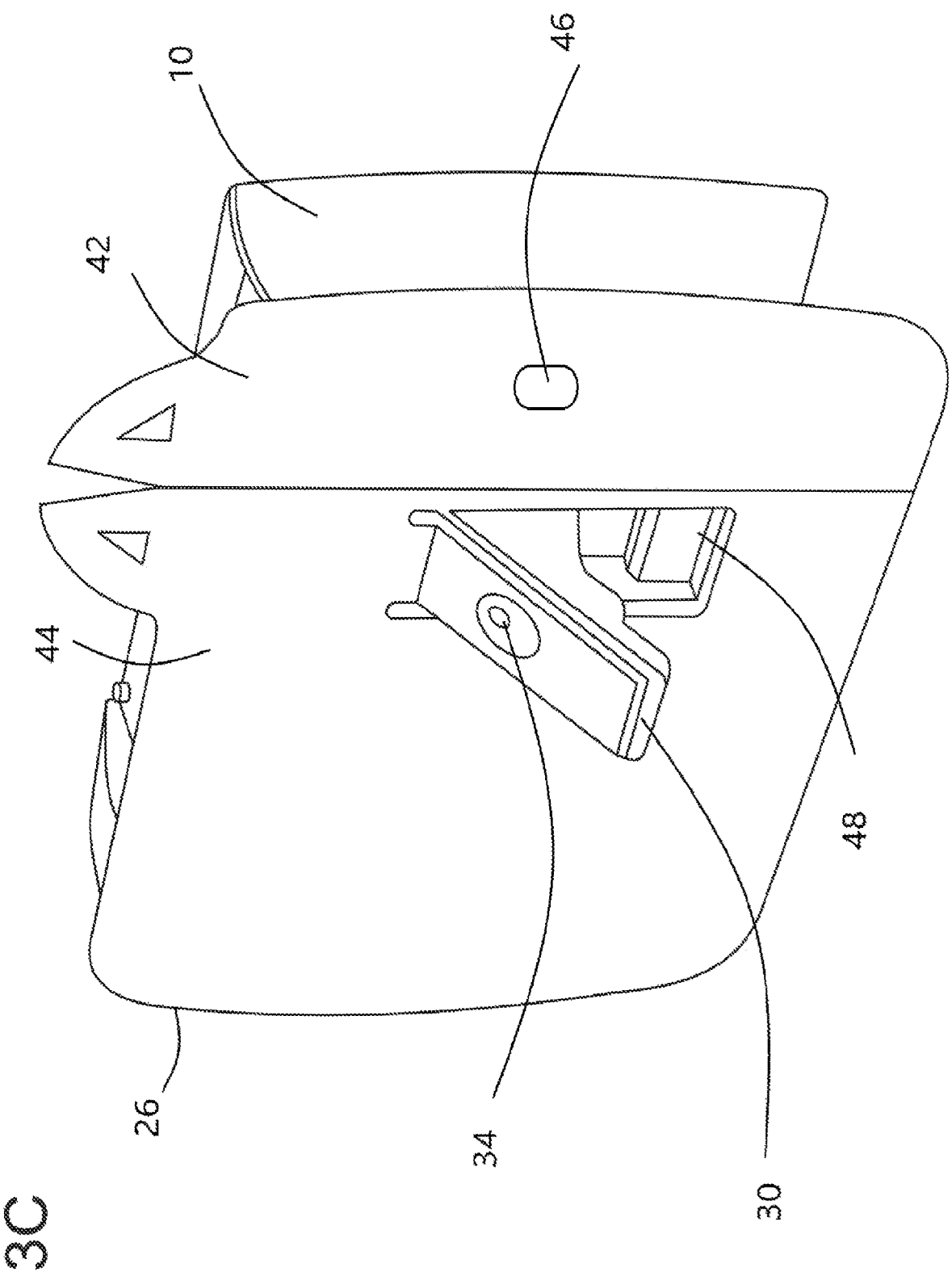

The device housing 10 may include a number of features, for example, a front side 10a, and a back side 10b. The back side 10b may include or be removably associated with a contact substrate 26 as shown in FIG. 3C. The contact substrate 26 may be used to adhere the housing 10 onto a target site of a user during use of the device 100.

FIG. 3C shows a view of the back side of the device 100, wherein the flap portion 30 with aperture 34 is shown extending from the back side 10b of the housing. The contact substrate 26 is provided on the back side 10b, and an adhesive layer 42 with a removable layer 44 is located on the contact substrate. Removal of the removable layer 44 from the adhesive layer 42 exposes the adhesive layer 42 and allows the contact substrate to be affixed to a contact site of a user. A contact substrate sensor 46 is provided to detect removal of the removable layer 44 and/or exposure of the adhesive layer 42, and/or to detect contact with a contact site of a user. The contact substrate 26 may be removable from the housing 10, and replaceable, in some non-limiting embodiments. In other non-limiting embodiments, the contact substrate 26 may be reusable. Methods for removal and replacement of the contact substrate 26 can be found in FIGS. 4-6.

The contact substrate 26 may include a substrate opening 48 for receiving the flap portion 30, as can be seen in FIG. 3, for example. FIG. 4A shows a first step in one embodiment of the replacement of a contact substrate 26' wherein one or more tabs 50 on a portion of the housing 10 may align with one or more tab openings 52 of the contact substrate 26', such that the tabs are received there within, and the substrate opening 48 which aligns with the flap portion 30 of the housing 10 as shown in FIG. 3C. Tabs 54 on the contact substrate 26' may align with tab openings 56 on the housing as shown in FIG. 4B-C, such that each respective tab 54 and tab opening 56 when aligned, may allow the contact substrate 26' and housing 10 to removably or permanently associate with one another (i.e., in one embodiment, "snap" together). FIG. 4D shows a lever 58 on the contact substrate 26' that may be manipulated to release the contact substrate 26' from the housing 10. FIGS. 4E-4F show front and back views, respectively of the device 10, wherein tabs 50, 54 are provided. FIG. 4F provides a bottom view of the device, wherein in one embodiment one or more sensors for detecting contact 46 may be provided to detect contact between the device housing 10 and the contact site of the user. The one or more sensors for detecting contact 46 between the device 10 and the user are shown on the bottom surface of the housing 10 in FIG. 4F. In one embodiment, the one or more sensors for detecting contact 46 may be on the bottom of the housing 10 or on the contact substrate 26'; however, as referenced above, one or more sensors for detecting contact 38 between the user and the device may detect contact between the flap portion 30 and the user as shown in FIG. 3B in embodiments including a flap portion 30.

In another embodiment, shown in FIG. 5A-5D, a contact substrate 26" may be removably slid onto a back side of a housing 10, wherein the housing 10 may include one or more notches 60 and the contact substrate 26" may include one or more protrusions 62 to be received within the notches 60, whereupon aligning the protrusions 62 with the notches 60 as shown in FIG. 5A, and sliding the contact substrate 26" relative to the housing, allows the contact substrate 26" to be placed thereon. FIG. 5C-5D show a perspective back view and a back view of the device with the contact substrate 26" affixed onto the housing, wherein the protrusions 62 are received within notches 60.

In yet a further nonlimiting embodiment as shown in FIGS. 6A-F, a contact substrate embodiment 26' may be removably affixed onto a back side of a housing 10 by way of an end tab 64 on the housing which is receivable within an end opening 66 on contact substrate 26'" as shown in FIG. 6A-6C. The contact substrate 26'" can then be pressed onto the back of the housing 10b, such that the flap portion 30 may traverse the contact substrate opening 48 as shown in FIGS. 6A-6B. FIG. 6C shows a view in which the end tab 64 of the housing has been received within the end opening 66 of the contact substrate 26'". In FIG. 6D the contact substrate 26'" has been fully affixed to the housing 10 in preparation for use of the device 100 during a training event. FIG. 6E provides a front side view of the device, and FIG. 6F provides a back-side view of the device showing another embodiment of a substrate opening 48', which allows for a larger opening area. The larger opening area may compensate for any interference to the needle safety shield (i.e., flap portion 30).

In a further non-limiting embodiment, the device 100 may be associated with a package 200, wherein the package may interface with the device 100 before, during or after use thereof. The package and the device may be connected by wired or wireless communication. In one embodiment, the package may transmit to or receive data from the device, and/or vice versa. In one embodiment, the remote device may include a smart device for monitoring the injection training device 100. In another embodiment, the package may be associated with or communicatively connected to a smart device for monitoring use of the package and/or the training device.

In another non-limiting embodiment 200, shown in FIG. 7, an injection training system is provided. The system 200 may include an injection training device 100 for simulating a drug delivery device, the training device 100 may include a housing 10, an attachment mechanism 11 for affixing the housing 10 to a user, an actuation member 18 configured to simulate actuation of an injection device, a contact site sensor 31 (not shown) for detecting contact between the housing and a contact site of a user, wherein the housing 10 is configured to be affixed to the contact site of the user during an injection training event. The details of the training device embodiment 100 are shown and described in previous Figures herein. The contact site sensor 31 may be provided on a portion of the housing that contacts the user during an injection training event with the device 100, such that a signal can be provided to the device 100 if the contact site sensor 31 detects contact exists, or contact does not exist between the contact site sensor and the user, in one example. In other examples described herein, other sensors for detecting contact or proximity may be provided on various portions of the device 100, for example on a flap portion 30 of the device. In yet another non-limiting embodiment, contact between the device 100 and a user may be detected when a switch is activated indicating the flap portion 30 has be pressed against a back side of the device 100.

The system 200 shown in FIG. 7 further includes a cooperating package 220 communicatingly connected to the injection training device 100. The package 220 may include a receiver portion 250 for receiving and/or retaining the injection simulation device 100. The package 220 may include a power source 240 (not shown), a processor, and a package sensor 260 for sensing receipt and removal of the injection training device 100 relative to the receiver 250. The injection training system 200 may detect a condition of the device and, may optionally, provide feedback based on the condition detected. The injection training system 200 and the device 100 may be wired, or wirelessly connected, such that conditions of the device 100, including sensor information, positioning information, usage information, among other data may be detected by or received by and, in some instances, output from the package 220 to a user. In other embodiments, is information may be sent to a remote location, or may be stored in the package 200, on the device 100, or remotely.

The conditions detected by the system may include correct operations of the device, or error conditions, in non-limiting examples. One such error condition may include a wet injection error, wherein when the contact site sensor does not detect contact with the contact site of a user, after the actuation member has been actuated and prior to completion of a training event, an error condition is detected. A wet injection error condition may be used to prevent users from 1) incorrectly placing the device on a contact site of a user during an injection training event, or 2) correctly placing the device during an injection training event followed by removal of the device from the contact site of the user, in non-limiting embodiments. The system may further include a timekeeping component, such that based on a combination of detecting removal of contact of the device from the user and time, a wet injection error condition may be detected, in one non-limiting example. The system may further include a signal output component (i.e., speaker or light or display, in non-limiting examples) 224 for providing auditory instructions for use of the device and/or auditory feedback, prior to, during, or following use of the device and/or system. The signal output component may further indicate the start and/or completion of a simulated dose using the device and/or system during a training event. The indication may be provided with an auditory signal, such as a beep, in a non-limiting example. Other indicators known to those skilled in the art may also, or alternatively be used.

As aforementioned, the system 200 may provide stepwise instructions for using the system and the training device to the user. The instructions may be initiated upon removal of the injection training device 100 from the package 220, in one embodiment. In another embodiment, the system 200 and/or the training device 100 may be powered on upon removal of the device 100 from the package 220.

In some non-limiting embodiments herein, the injection simulation member may include an agitator, which may be provided to cause a sensation to a user to indicate that the injection simulation member has been delivered. This sensation may, in some non-limiting embodiments, cause discomfort, but not pain to a user, and will not cause damage to or puncture the skin of the user. In one embodiment, injection simulation member includes an agitator portion near its distal end configured to simulate the tactile feel of a needle during an injection without puncturing the surface when interfacing the contact site of the user. In another non-limiting embodiment, the agitator may be provided on another portion of the injection training device, (i.e., extending from the back side of the housing in a non-limiting embodiment) so as to agitate the contact area of the user. For example, the agitator contacts the skin of the user to simulate the tactile feel of a needle during an injection without puncturing the surface.

In further non-limiting embodiments, the agitator may include an agitator base portion associated with a distal end of the injection simulation member, or associated with the housing, an agitator tip, and an agitator body between the base portion and the agitator tip. In still a further non-limiting embodiment, the agitator body may be between 1.0-3.0 mm in length. In another non-limiting embodiment, the agitator body may include a tip portion located 0.2-0.5 mm proximally from the agitator tip. In another non-limiting embodiment, the surface area of a transverse plane along the body may range from [0.03-10 mm$^2$]. In still a further non-limiting embodiment, a surface area of a transverse plane of the base portion may be greater than a surface area of a subjacent transverse plane of the body or a transverse plane of the tip portion. In yet a further non-limiting embodiment, a surface area of a transverse plane of the base portion may be substantially equal to a surface area of a subjacent transverse plane of the body or a transverse plane of the tip portion. In another non-limiting embodiment, the surface area of a transverse plane of the tip portion may range between 0.03-3.5 mm$^2$. Teachings of examples of agitators that could be implemented on the injection training device embodiments illustrated herein are set forth in WO2016/123144 and U.S. Provisional Application 62/455, 934. The teachings of any cited references are incorporated herein in their entirety to the extent not inconsistent with the teachings herein.

What is claimed is:

1. An injection training device comprising:
   a housing defining a receptacle having an opening;
   a removable container, receivable within the receptacle;
   an actuation member configured to simulate actuation of an injection device;
   at least one sensor comprising a container sensor for detecting receipt of the removable container within the receptacle; and
   a processor;
   wherein the injection training device detects a condition of the device and, optionally, provides feedback based on the condition detected; and
   wherein the housing is configured to be affixed to a contact site of a user for an injection training event.

2. The injection training device of claim 1, further comprising an injection simulation member configured to simulate a needle, wherein activation of the actuation member delivers the injection simulation member from the device.

3. The injection training device of claim 1, wherein the condition comprises an error condition.

4. The injection training device of claim 1, wherein the feedback comprises corrective feedback and/or positive feedback.

5. The injection training device of claim 1, wherein the housing comprises a front side and a back side, wherein said contact substrate is removably associated with the back side.

6. The injection training device of claim 5, wherein the contact substrate is removable.

7. The injection training device of claim 5, wherein the contact substrate comprises an adhering portion, configured to affix the housing to the contact site of the user.

8. The injection training device of claim 1, further comprising a receptacle closure member, the receptacle closure member for securing an entrance to the opening, and optionally, a receptacle closure member sensor for detecting a condition of the receptacle closure member.

9. The injection training device of claim 7, wherein the contact substrate comprises a removable layer, such that removal of the removable layer exposes the adhering portion of the contact substrate.

10. The injection training device of claim 9, further comprising a contact substrate sensor, wherein the contact substrate sensor is disposed between the removable layer and the contact substrate to detect a contact between the removable layer and the contact substrate.

11. The injection training device of claim 1, further comprising an actuation sensor, wherein the actuation sensor detects actuation of the actuation member.

12. The injection training device of claim 2, wherein a flap portion movable relative to the housing extends from the back side of the housing, said flap portion for contacting the contact site of the user, wherein upon removal of the device from a contact site of the user, the flap portion covers a portion of the injection simulation member.

13. The injection training device of claim 12, wherein the device comprises a biasing member associated with the flap portion, such that the flap portion is biased away from the device, and optionally, a flap portion sensor to detect whether the flap portion has been compressed.

14. An injection training system comprising:
an injection training device for simulating a drug delivery device, the training device comprising,
a housing;
an attachment mechanism for affixing the housing to a user;
an actuation member configured to simulate actuation of an injection device;
a contact site sensor for detecting contact between the housing and a contact site of a user, wherein the housing is configured to be affixed to the contact site of the user during an injection training event; and
a cooperating package communicatingly connected to the injection training device, the package comprising a receiver for receiving the injection training device, the package further comprising:
a power source;
a processor; and
a package sensor for sensing receipt and removal of the injection training device relative to the receiver,
wherein the injection training system detects a condition of the device and, optionally, provides feedback based on the condition detected.

15. The injection training system of claim 14, wherein the receiver comprises the package sensor.

16. The injection training system of claim 14, wherein the housing further defines a receptacle having an opening for receiving a container.

17. The injection training system of claim 16, further comprising a removable container, receivable within the receptacle, the removable container configured to simulate a medicament container.

18. The injection training system of claim 14, wherein when the contact site sensor does not detect contact with the contact site of a user, after the actuation member is actuated and prior to completion of a training event, an error condition is detected.

19. The injection training system of claim 16, wherein the housing further comprises a receptacle closure member for securing an entrance to the opening, and optionally, a receptacle closure member sensor for detecting the position of the receptacle closure member relative to the opening.

20. The injection training system of claim 14, wherein a flap portion extends from a back side of the housing, said flap portion for engaging the contact site of the user, and optionally, a biasing member associated with the flap portion, such that the flap portion is biased away from the device.

21. The injection training system of claim 20, wherein upon removal of the device from the contact site of the user, the flap portion covers a portion of the injection simulation member.

22. The injection training system of claim 20, wherein the contact site sensor is associated with the flap portion, such that when the flap portion is biased inward toward the housing, the system detects contact between the injection training device and the contact site of the user.

23. An injection training device comprising:
a housing;
an actuation member configured to simulate actuation of an injection device;
at least one sensor comprising a contact area sensor for detecting contact between the device and a user;
an injection simulation member configured to simulate a needle, wherein activation of the actuation member delivers the injection simulation member from the device;
a processor;
wherein the injection training device detects a condition of the device and, optionally, provides feedback based on the condition detected; and
wherein the housing is configured to be affixed to a contact site of a user during an injection training event, and wherein when following actuation of the actuation member, and prior to completion of an injection training event, contact between the device and the user is not detected, an error condition is detected.

* * * * *